United States Patent
Garcia-Luna-Aceves et al.

(10) Patent No.: US 7,027,449 B2
(45) Date of Patent: Apr. 11, 2006

(54) METHOD FOR MAINTAINING RESERVATION STATE IN A NETWORK ROUTER AND RESULTING SCALABLE INTEGRATED ARCHITECTURES FOR COMPUTER NETWORKS

(75) Inventors: J. J. Garcia-Luna-Aceves, San Mateo, CA (US); Srinivas Vutukury, Sunnyvale, CA (US)

(73) Assignee: The Regents of the University of California, Oakland, CA (US)

(*) Notice: Subject to any disclaimer, the term of this patent is extended or adjusted under 35 U.S.C. 154(b) by 1042 days.

(21) Appl. No.: 09/975,735

(22) Filed: Oct. 10, 2001

(65) Prior Publication Data

US 2002/0097726 A1 Jul. 25, 2002

Related U.S. Application Data

(60) Provisional application No. 60/240,654, filed on Oct. 10, 2000.

(51) Int. Cl.
*H04L 12/28* (2006.01)
*G01R 31/08* (2006.01)

(52) U.S. Cl. .................................. 370/401; 370/235.1
(58) Field of Classification Search ...................... None
See application file for complete search history.

(56) References Cited

U.S. PATENT DOCUMENTS 6,516,966 B1* 2/2003 Leonard ..................... 220/480
6,538,416 B1* 3/2003 Hahne et al. ............... 370/431
6,594,268 B1* 7/2003 Aukia et al. ................ 370/400
2004/0170125 A1* 9/2004 O'Neill ...................... 370/230

FOREIGN PATENT DOCUMENTS

EP 0 762 799 A2 3/1997
EP 0 982 899 A2 3/2000

OTHER PUBLICATIONS

Zhang, L. et al., "RSVP: A New Resource ReSerVation Protocol", IEEE Network, IEEE Inc., New York, US, vol. 7, No. 5, Sep. 1993, pp. 8-18, XP000828446 ISSN: 890-8044.
Wang, Z. and Crowcroft, J.; "Quality-of-Service Routing for Supporting Multimedia Applications," IEEE Journal on Selected Areas in Communications, vol. 14, pp. 1128-1234, (1996).

(Continued)

*Primary Examiner*—Duc Ho
(74) *Attorney, Agent, or Firm*—John P. O'Banion

(57) ABSTRACT

Methods are described for maintaining a small bounded aggregate state within network routers pertaining to selected architectural families. Small bounded reservations states are utilized wherein the method is fully scalable for use on large networks. The size of the aggregate state and the complexity of the associated refresh mechanism is determined by the parameters of the network, such as size, and classes, which is in contrast to states based on the number of end-user flows. The method can render deterministic bandwidth use within the network wherein real-time multimedia applications may be accorded strict delay and bandwidth guarantees. The invention provides a middle-ground between the stateful Intserv and the stateless SCORE architectures.

50 Claims, 15 Drawing Sheets

OTHER PUBLICATIONS

Parekh, A.K. and Gallager, R.G.; "A Generalized Processor Sharing Approach to Flow Control in Integrated Services Networks: The Single-Node Case," IEEE/ACM Transactions on Networking, vol. 1, pp. 344-357, Jun., 1993.

Parekh, A.K. and Gallager, R.G.; "A Generalized Processor Sharing Approach to Flow Control in Integrated Services Networks: The Multiple-Node Case," IEEE/ACM Transactions on Networking, vol. 2, pp. 137-150, Apr., 1994.

Stoica, I. and Zhang, H.; "Providing Guaranteed Service Sithout Per Flow Management," Proceedings of ACM SIGCOMM, pp. 81-94, Sep., 1999.

Stoica, I. and Zhang, H.; "A Model for Service Differentiation in the Internet," NOSSDAV, pp. 1-14, Jul., 1998.

Goyal, P. and Vin, H.; "On the Effectiveness of Buffer in Deterministic Services," Proceedings of the International Workshop on Network and Operating System Support for Digital Audio and Video, pp. 1-12, Jul., 1998.

Grossglauser, M., Keshav, S., and Tse, D.; "RCBR: A Simple and Efficient Service for Multiple Time-Scale Traffic," Proceedings of ACM SIGCOMM, pp. 219-230, (1995).

Guerin, R. et al.; "QoS Routing Mechanisms and OSPF Extensions," Request for Comments 2676, IBM T.J. Watson Research Center and Network Working Group, pp. 1-50, (1998).

Guerin, R. et al.; "Scalable QoS Provision Through Buffer Management," Proceedings of ACM SIGCOMM, pp. 29-40, (1998).

Baker, F. et al.; "Aggregation of RSVP for IPv4 and IPv6 Reservations," Request for Comments 3175, Cisco Systems and Network Working Group, pp. 1-36, (1999).

Apostolopoulos, G. et al.; "On Reducing the Processing Cost of On-Demand QoS Path Computation," Journal of High Speed Networks, vol. 7, pp. 77-98, (1998).

Ma, Q. and Steenkiste, P.; "Quality-of-Service Routing for Traffic with Performance Guarantees," Proceedings IFIP International Workshop on Quality of Services, pp. 115-136, May, 1997.

Ma, Q. and Steenkiste, P.; "On Path Selection for Traffic with Bandwidth Guarantees," Proceedings of International Conference on Network Protocols, pp. 1-12 Oct., 1997.

Ferrari, D. and Verman, D.; "A Scheme for Real-Time Channel Establishment in Wide-Area Networks," IEEE Journal on Selected Areas in Communication, vol. 8, pp. 368-379, (1990).

Clark, D., Shenker, S. and Zhang, L.; "Supporting Real-Time Applications in an Integrated Services Packet Network Architecture and Mechanism," Proceedings of ACM SIGCOMM, pp. 1-13, Aug., 1992.

Georgiadis, L., Guerin, R., Peris, V. and Sivaranjan, K.; "Efficient Network QoS Provisioning Based on Per Node Traffic Shaping," IEEE/ACM Transactions on Networking, pp. 482-501, Aug., 1996.

Kandlur, D., Shin, K.G., and Ferrari, D.; "Real-Time Communication in Multi-Hop Networks," Proceedings RTAS, pp. 200-307, (1991).

Berson, S. and Vincent, S.; "Aggregation of Internet Integrated Services State," University of Southern California Information Sciences Institute, Internet Drafts, pp. 1-12, Nov., 1997.

Apostolopoulos, G. et al., "Quality of Serice Based Routing: A Performance Perspective," Proceedings of ACM SIGCOMM, pp. 1-12, (1998).

Braden, R., Clark, D. and Shenker, S.; "Integrated Services in teh Internet Architecture: An Overview," Request for Comments 1633, University of Southern California Information Sciences Institute, Network Working Group, pp. 1-28, Jun., 1994.

Cruz, R.L.; "A Calculus for Network Delay, Part I: Network Elements in Isolation," IEEE Trans. Inform. Theory, vol. 37, No. 1; pp. 114-121, (1991).

Cruz, R.L.; "A Calculus for Network Delay, Part II: Network Analysis," IEEE Trans. Inform. Theory, vol. 37, No. 1, pp. 121-141, (1991).

Shreedhar, M. and Varghese, G.; "Efficient Fair Queuing Using Deficit Round Robin," Proceedings of ACM SIGCOMM, pp. 231-242, (1995).

Demers, A., Keshav, S. and Shenker, S.; "Analysis and Simulation of a Fair Queing Algorithm," Proceedings of ACM SIGCOMM, pp. 1 thru 12, (1989).

Zhang, L.; "VirtualClock: A New Traffic Control Algorithm for Packet Switching Networks," ACM SIGCOMM, pp. 19-29, (1990).

Partridge, C.; "A Proposed Flow Specification," Request for Comments 1363, BNN, Network Working Group, pp. 1-20, Sep., 1992.

Shenker, S., Partridge, C. and Guerin, R.; "Specification of Guaranteed Quality of Service: An Overview," Request for Comments 2212, Xerox PARC, Network Working Group, pp. 1-20, Sep., 1997.

Shenker, S. and Wroclawski, J.; General Characterization Parameters for Integrated Service Network Elements, Request for Comments 2215, Xerox PARC, Network Working Group, pp. 1-16, Sep., 1997.

Wroclawski, J.; "Specification of the Controlled-Load Network Element Service," Request for Comments 2211, MIT Laboratory for Computer Science, Network Working Group, pp. 1-19, Sep., 1997.

Crawley, E. et al.; "A Framework for Qos-Based Routing in the Internet," Request for Comments 2386, Argon Networks, Network Working Group, pp. 1-35, Aug., 1998.

Rosen, E., Viswanathan, A., and Callon, R.; "Multiprotocol Label Switching Architecture," Request for Comments 3031, Cisco Systems, Network Working Group, pp. 1-61, Jan., 1997. Republished in Jan., 2001.

Black, D. et al.; "An Architecture for Differentiated Services," Request for Comments 2475, Torrent Networking Technologies, pp. 1-36, Dec., 1998.

Kweon, S. and Shin, K.; "Providing Deterministic Delay Guarantees in ATM Networks," IEEE/ACM Transaction Networking, vol. 6, No. 6, pp. 838-850, Dec., 1998.

* cited by examiner

```
01  PROCEDURE AGRA()
```

```
02  if a REFRESH message arrived from k with bandwidth b for j.
03     $B^i_{jk} \leftarrow b$;
04  if a timeout occured, then for each destination j,
05     let the refresh mesages for j recieved during the
06        last refresh period $T_R$ have a total bandwidth of $BT^i_j$;
07     if node is in READY state for j and $BT^i_j > B^i_{js}$
08        CALL DIFFCOMP $(BT^i_j - B^i_{js})$;
09     $B^i_{js} \leftarrow MIN \{B^i_{js}, BT^i_j\}$;
10     send REFRESH message to s with bandwidth $B^i_j$;
11  if link to k failed, for all j set $B^i_{jk} \leftarrow 0$.
12  if a RELEASE message is received from k with bandwidth b for j,
13     $B^i_{js} \leftarrow B^i_{js} - b$;
14     if node is READY for j, CALL DIFFCOMP $(b)$;
15     otherwise the node is in WAIT state for j, send [ACK,j] to k;
16  if last ACK message is received for j,
17     become READY for j,
18     send [ACK, j] to s;
```

```
PROCEDURE DIFFCOMP(j, b)
```

```
01  distribute b among this node and all predecessor neighbors;
02  terminate as many flows at this node to satisfy this node's share;
03  for each predecessor neighbor k and its share of $b_k$,
04     send [RELEASE, j, $b_k$] to k;
05  set node as WAIT for j;
```

PROCEDURE Multipath-packet-Forwarding(P)
{Executed at router i on arrival of a packet for j.}
BEGIN $\phi_{jk}^i \leftarrow \frac{B_{jk}^i}{B_j^i}$ for some $k \in S_j^i$;
Let $W_{jk}^i \leq \phi_{jk}^i W_j^i$ for some $k \in S_j^i$;
Forward packet to neighbor $k$;
$W_{jk}^i \leftarrow W_{jk}^i + length(P)$;
$W_j^i \leftarrow W_j^i + length(P)$;

END 01
02
03
04
05
06
07
08
09

FIG. 8

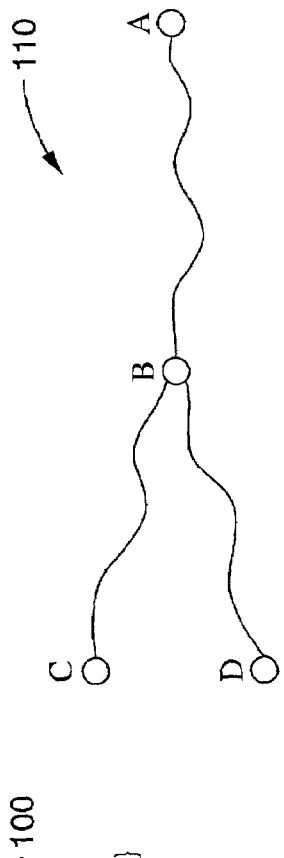

PROCEDURE Refresh-PKT-LS-Arch(u)
{Periodically executed at node i, for label u}
BEGIN
  Let the refresh messages from neighbors received in $T_R$ specify
      a total bandwidth of $B_u^T$ for label $u$;
  LET the r.t.e for $u$ be $(u, k, u, B_u)$;
  $B_u \leftarrow MIN(B_u, BT_u)$;
  Send refresh message to $k$ with bandwidth $B_{uj}$
END 01
02
03
04
05
06
07
08
09

FIG. 10

```
01  PROCEDURE AgreeEvent (type, j, g, k, b)
```

02  if(type = REFRESH), $B_{j,g,k}^i \leftarrow B_{j,g,k}^i + b$;
03  if (type = TIMEOUT), then {
04      $bt \leftarrow \sum_{k \in s^j} B_{j,g,k}^i + I_{j,g}^i$;
05      $bw \leftarrow \sum_{k \notin s^j} B_{j,g,k}^i$;
06      if ($bt < bw$), then {
07          Divide $bt$ into $bk$ such that $\sum b_k = bt$ and $b_k \leq B_{j,g,k}^i$;
08          $B_{j,g,k}^i \leftarrow b_k$;
09      }
10      if $bt > bw$ and $state_{j,g}^i = PASSIVE$, then
11          CALL DiffComp (j, g, bt - bw);
12      for each $k \in S_j^i$ send [REFRESH, j, g, k, $B_{j,k}^i$];
13  }
14  if (type = RELEASE), then {
15      $B_{j,g,k}^i \leftarrow B_{j,g,k}^i - b$;
16      if ($state_{j,g}^i = PASSIVE$), then
17          CALL DiffComp (j, g, b);
        otherwise send [ACK, j, g] to k;
18  }
20  if (type = ACK and last ACK message for j and g) {
21      $state_{j,g}^i \leftarrow PASSIVE$
22      send [ACK, j, g] to s, if s is waiting for ACK;
    }
24  if(type = SETUP) then // s is the successor on the path
25      $B_{j,g,k}^i \leftarrow B_{j,g,k}^i + b$; $B_{j,g,s}^i \leftarrow B_{j,g,s}^i + b$;
26  if(type = TERMINATE) then
27      $B_{j,g,k}^i \leftarrow B_{j,g,k}^i - b$; $B_{j,g,s}^i \leftarrow B_{j,g,s}^i - b$;

```
28  PROCEDURE DiffComp (j, g, b) at node i
```

29      if ($b \leq I_{j,g}^i$), then terminate flows for j and
30          class g that add up to at least b and return;
32      $br \leftarrow b - I_{j,g}^i$;
    Divide $br$ into $b_k$ and $k \notin S_j^i$ such that
33      $\sum b_k = br$ and $b_k \leq B_{j,g,k}^i$;
34      for each $k \notin S_j^i$, send [RELEASE, j, g, $b_k$] to k;
35      $state_{j,g}^i \leftarrow ACTIVE$;

FIG. 12

METHOD FOR MAINTAINING RESERVATION STATE IN A NETWORK ROUTER AND RESULTING SCALABLE INTEGRATED ARCHITECTURES FOR COMPUTER NETWORKS

CROSS-REFERENCE TO RELATED APPLICATIONS

This application claims priority from U.S. provisional application Ser. No. 60/240,654 filed on Oct. 10, 2000, incorporated herein by reference.

STATEMENT REGARDING FEDERALLY SPONSORED RESEARCH OR DEVELOPMENT

This invention was made with Government support under Grant Nos. F19628-96-C-0038 and F30602-97-1-0291, awarded by the Air Force Office of Scientific Research (AFOSR). The Government has certain rights if this invention.

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to bandwidth reservation within multipath networks, and more particularly to a method of limiting and maintaining the reservation state in network routers.

2. Description of the Background Art

Real-time multimedia applications require strict delay and bandwidth guarantees. A network can provide such deterministic guarantees to an application only if it reserves the required bandwidth and other necessary resources. Based on this reservation paradigm, the "Internet Engineering Task Force" (IETF) developed the "Integrated Services" (Intserv) architecture and the RSVP signaling protocol. A major concern, however, with the Intserv/RSVP architecture is that the soft-state mechanism it utilizes to maintain the consistency of reservation state may not be scalable to high-speed backbone networks. In response to a sufficiently large number of flows, the refresh messages, in addition to consuming memory, processing power, and bandwidth, can experience significant queuing delays which can precipitate failures of the soft-state mechanism. For the refresh mechanism to properly scale, the reservation state size must either be eliminated or drastically reduced. The Intserv architecture was directed to providing such deterministic delay guarantees to applications that require it. In Intserv, the network reserves the required link bandwidth for each application, and then uses fair scheduling algorithms, such as WFQ, to ensure that each application receives its allotted bandwidth. Routers in the Intserv model must therefore remember the reservations for each flow and service each flow according to its reservation.

As the links in backbone networks reach gigabit capacities, routers are expected to carry large number of flows, and the question arises as to whether the routers will be capable of scheduling the packets in a timely manner. For instance, if v is the number of flows passing through a link, sorted-priority schedulers require $O(\log(v))$ instructions to make a per-packet scheduling decision. While scalability of link scheduling is a major concern, a more serious problem is related to maintaining the consistency of reservations in the presence of resource failures and control message loss. If resource reservations understate the actual reservations, delays cannot be guaranteed. However, resources are wasted when resource reservations overstate actual reservations. To implement robust mechanisms for maintaining resource reservations, the IETF proposed the RSVP which uses soft-state refreshing to maintain the reservation state. As a result of a large number of flows in the backbone, the volume of refresh messages can be sufficient to create delays and packet losses in response to the congestion. Refresh messages are time-sensitive and such delays and losses can easily destabilize the refresh mechanism. To deliver refresh messages in bounded time, the state size is preferably bounded. Therefore, scheduling and soft-state refreshing are two components of the Intserv architecture, among others, that would benefit from scalable solutions.

Certain schedulers which are based on a framing strategy can perform scheduling decisions in $O(1)$, but provide looser delay bounds. Scalable solutions to soft-state reservations, however, are not as easily forthcoming, due to additional issues such as packet classification, and QoS path selection that require scalable solutions for successful implementation of Intserv. The packet classification problem, the QoS routing problem, and the solutions thereof are becoming well known in the industry, and are therefore not described herein.

It may be appear that with current high-speed processors and inexpensive memory, the Intserv architecture and the associated RSVP can be implemented using per-flow processing. It will be appreciated, however, that the main concern is that the size of the reservation state and refresh message overhead are determined in response to the number of flows. When the volume of refresh messages is high, the effect of queuing delays due to congestion cannot be ignored, even when the refresh messages are forwarded with highest priority. It should be considered that, when refresh messages are delayed, the flows can lose their reservations. Delayed refresh messages can create a cascade effect wherein additional messages become delayed downstream. To prevent this situation, the refresh messages themselves should be delivered within a bounded time. This, however, is impossible if the bandwidth requirements for the refresh messages are unknown, as is the case in per-flow management. Accordingly, it is highly desirable that the reservation state depend only on network parameters, such as number of nodes, links, and classes, rather than the behavioral patterns of the end users. Adopting such a paradigm provides network designers with additional leverage to bound the bandwidth requirement of refresh messages, and to allot them a fair share of the existing bandwidth, perhaps treating them as another real-time flow at the links.

One approach to providing a scalable Intserv solution is to eliminate the per-flow reservation state in the core routers and follow a stateless approach similar to Diffserv. The SCORE architecture represents this approach to providing deterministic guarantees without per-flow state management in the core. SCORE moves the per-flow reservation state from the routers into the packets of the flows. Each packet of a flow carries the reservation and other dynamic state information that is required for scheduling. The reservation state in the packets is utilized by the core-routers to estimate the aggregate reservation on the links. There are no explicit refresh messages and thus the problems associated with lost or delayed refresh messages are greatly diminished. However, on closer inspection, it should be appreciated that the estimation algorithms are heavily driven by individual flow behavior. For instance, flows are required to send "dummy packets" when their rate falls below a threshold to prevent errors from occurring within the estimation algorithms that would result in inefficient utilization of network bandwidth. In addition, this approach does not particularly reduce the processing or bandwidth overhead needed for reservation maintenance, which is a major concern with RSVP. It appears, therefore, that SCORE is an attractive but partial solution, because mechanisms within the routers are heavily dependent on end-user behavior.

Therefore, a need exists for providing strict delay and bandwidth guarantees within a scalable architecture based on network parameters. The present invention satisfies those needs, as well as others, and overcomes the deficiencies of previously developed architectures.

BRIEF SUMMARY OF THE INVENTION

The present invention pertains to a family of architectures in which the per-flow reservation state in the routers is replaced with a small bounded aggregate state. The size of the aggregate state and the complexity of the associated refresh mechanism is determined by the network parameters, such as size and classes, rather than the number of end-user flows. This enables design of a robust refresh mechanism in which refresh messages never experience unbounded queuing delays. The architectures are scalable and provide similar delays to the Intserv architecture. The invention can be viewed as a middle ground alternative between the stateful Intserv and our recently developed stateless architecture SCORE.

The invention includes a number of aspects, such as a shaper-battery comprising a set of token-buckets arranged in the form of a tree for aggregating network flows into classes. In addition, a burst-drain-time or burst-ratio is utilized for aggregating flows. Furthermore, a reservation maintenance protocol referred to as "AGgregate REservation Establishment protocol" (AGREE), is provided to manage consistency of aggregate reservations. AGREE is the first reservation protocol that uses diffusing computations to maintain consistency of the reservations. Based on these flow aggregation techniques and reservation protocol, the invention also comprises architectures (GSAI) that support real-time applications in large high-speed networks.

The present invention is based on the paradigm of that Intserv solutions can be scalable if the router state size and all related algorithms are solely governed by the network parameters and not the end-user flows. It is believed that this approach should yield a number of merits since network parameters are more stable than user behavior, wherein architectures based solely on network parameters should therefore provide improved stability and reliability. The present invention provides techniques that replace the per-flow state and per-flow processing with mechanisms whose complexity is essentially determined by the network parameters. These techniques echo the principle reason behind the scalability of the current Internet architecture, wherein the routing state is a function of the number of nodes in the network.

The present invention attempts to provide an Intserv solution in which the reservation state size and the complexity of the refresh algorithms are independent of the number of individual flows. This is achieved by replacing the full state of Intserv with a much smaller state that is static and can be determined a priori from the network structure. The key to such a reduction is flow aggregation, in which large numbers of flows are merged into a small set of aggregated flows based on such criteria as class and destination. The core routers maintain state only for aggregated flows and process only aggregated flows. The aggregation is such that, by providing the guarantees to the aggregated flow, the guarantees of the individual flows within the aggregate are also guaranteed. The reservation state is drastically reduced and, more importantly, the state size arising out of these aggregation techniques is a function of the network parameters, rather than the number of user flows, and thus is easily bounded. Architectural complexity within the present approach, however, remains substantially linear with respect to number of existing network nodes.

The aggregation schemes described herein differ in a number of important regards from those currently being proposed. It will be appreciated that the aggregation technique proposed for RSVP is designed for aggregating reservation state of flows within a single multicast group. In contrast to that, the aggregation method proposed herein aggregates state of flows belonging to different multicast groups and as such are orthogonal to aggregation within RSVP.

Aggregating flows based on destination pair and providing bandwidth guarantees have been considered; however, the delay bounds offered in that proposal were not deterministic. In other typical proposed aggregation techniques, the computing delay bounds in a dynamic environment are not generally discussed. A system architecture based on a fluid model provides intuition and illustrates many key ideas in flow aggregation, link scheduling, signaling and soft-state refresh mechanisms. In the next section, non-fluid architectures approximating the system architecture are presented.

An object of the invention is to provide for the delivery of selected traffic over a given network which is subject to a predetermined maximum delay, and a bandwidth guarantee.

Another object of the invention is to provide for the communication of selected multimedia, or other real-time data, over a network at a sufficient bandwidth to assure uninterrupted playback, and/or operation.

Another object of the invention is to utilize reservation states within the routers having small bounded aggregate state.

Another object of the invention is to provide a reliable and robust method for maintaining the reservation state within the routers.

Another object of the invention is to provide a scalable architecture which generally yields the best attributes of both Intserv and SCORE.

Another object of the invention is to provide an architecture in which the complexity of the associated refresh mechanism is determined by network parameters instead of flow parameters.

Another object of the invention is to incorporate a shaper-battery for aggregating network flows.

Another object of the invention is to provide a reservation maintenance protocol that utilizes soft-states, but refreshes state on a per-aggregate basis.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 illustrates pseudocode for handling refresh messages according with an aspect of the present invention, shown with two procedures, AGRA( ), and DIFFCOMP( ).

FIG. 8 is pseudocode for a distributor according to FIG. 7, shown utilizing a weighted round-robin distribution algorithm.

FIG. 9 is a schematic of the merging of path suffixes according to an aspect of the present invention.

FIG. 10 is pseudocode fragment of soft-state refresh performed on a per-label, per-class, basis according to an aspect of the present invention.

FIG. 12 is pseudocode for event handling within the AGREE protocol according to an aspect of the present invention.

DETAILED DESCRIPTION OF THE INVENTION

Referring more specifically to the drawings, for illustrative purposes the present invention is embodied in the apparatus and methods generally shown in FIG. 1 through FIG. 20. It will be appreciated that the apparatus may vary as to configuration and as to details of the parts, and that the method may vary as to the specific steps and sequence, without departing from the basic concepts as disclosed herein.

1. System Architecture 1.1. Flow Aggregation

The well-known token-bucket parameters for input flow specification are $(\sigma,\rho)$, where $\sigma$ is the maximum burst size of the flow and $\rho$ is the average rate of the flow. Flow characteristics are enforced at the entrance using a token-bucket as exemplified within FIG. 1. If the flow has $\sigma=0$, which is possible only in the fluid model, then the flow is called a 0-burst flow.

A principle concept in the system architecture is that traffic in the routers is aggregated on a per-destination basis. The resource reservations are stored and refreshed on a per-destination basis, rather than on a per-flow basis. Routers only know the rates of incoming traffic on the links and the rates of outgoing traffic for each destination, they do not, however, maintain information on the rates of each flow.

Figure 1:
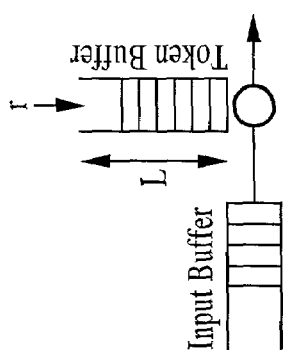
FIG. 1 is a schematic of a token-bucket utilized to allow for specifying the input flow.
Figure 2:
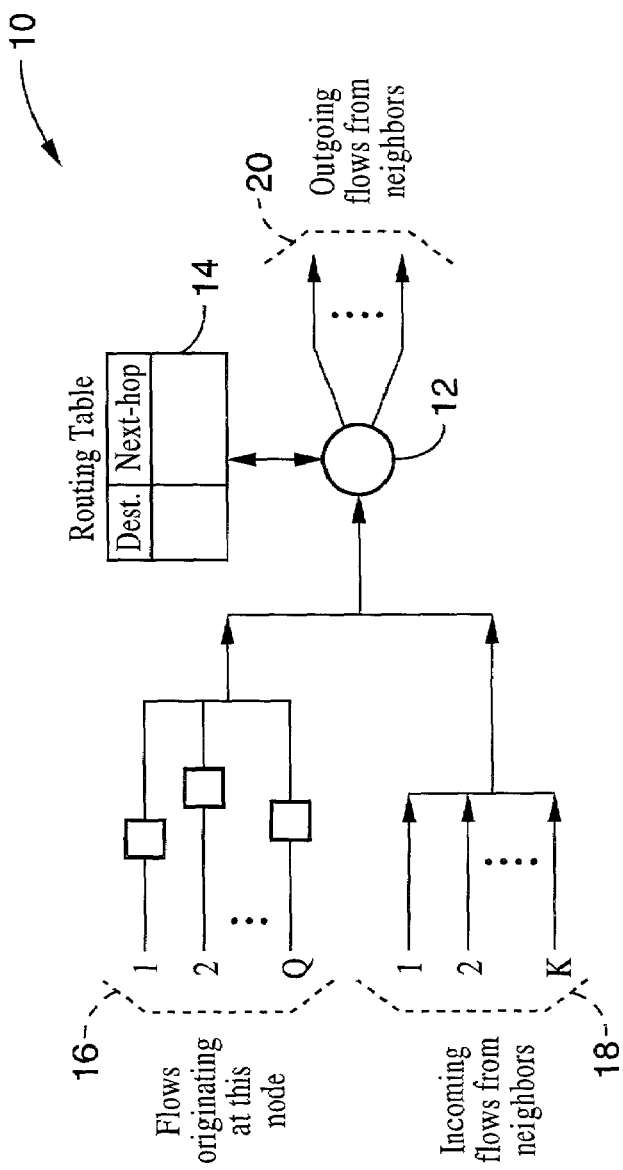
FIG. 2 is a schematic of traffic aggregation within a system architecture according to an embodiment of the present invention, showing aggregation of a particular destination.

FIG. 2 illustrates 10 how traffic bound for a particular destination is aggregated at a node 12, whose routing is controlled by a routing table 14. Each flow entering the router is shaped to a 0-burst flow using a token-bucket with a bucket size set to zero, which is referred to as a 0-burst shaper. Flows 16 which originate at router node 12, and flows 18 which originate from neighboring nodes are shown being shaped upon entering router 12. Because of the fluid model, link schedulers do not introduce any jitter and thus flows arriving from the neighbors are 0-burst flows. Therefore, all flows with the same destination can readily merge and the resulting aggregated flow 20 is a 0-burst flow. Each packet received by router 12 is forwarded to the respective outgoing link according to routing table 14. For simplicity, flows are always established along the single shortest-path from source to destination, a restriction that is relaxed in the architectures introduced in the next section. The routing table entry at router i for destination j is of the form <j, $PB_j^i$, $B_j^i$, s>, where $B_j^i$ is the total rate of traffic for j, s is the next-hop on the shortest-path from i to j and $PB_j^i=\{B_j, k^i|k\in N^i\wedge k\neq s\}$. When a new flow with rate $\rho$ and destination j is established through i, the bandwidth $B_j^i$ is incremented by $\rho$. And when the flow is terminated, $B_j^i$ is decremented by $\rho$. Alternatively, reservations can be timed out instead of using an explicit tear down. The signaling and soft-state maintenance of $B_j^i$ are described later in the section.

1.2. Link Scheduler

Each destination-aggregated flow arriving at a link scheduler is a 0-burst flow and hence can be merged with flows of other destinations. The link scheduler of link (i, k) maintains only the total allocated bandwidth $TB_k^i$ for real-time flows on that link which is equal to the sum of all $B_j^i$ for which k is the next-hop neighbor for j. The link scheduler employs weighted fair queuing to service the real-time flow at rate $TB_k^i$. There is no per-flow reservation information in the link scheduler. The flow specific information is maintained only at the entry router. The link admission test is simple and O(1) operation; a flow is admitted only if the available bandwidth $C_k^i - TB_k^i$, where $C_k^i$, is the capacity of link (i,k), is greater than or equal to the rate of the flow. It is assumed for the sake of simplicity, that all bandwidth on the link is available for real-time flows.

1.3. Reservation Maintenance

Unlike RSVP, the approach of the present invention utilizes per-destination refresh messages instead of per-flow refresh messages. A refresh message specifies a destination and the bandwidth for that destination. Let $T_R$ be the refresh period, and let the refresh messages received for j in the previous refresh period specify a total bandwidth of $BT_j^i$, which is compared with $B_j^i$ and if $BT_j^i \leq B_j^i$, then a refresh message is sent to next-hop s with bandwidth $BT_j^i$, thus releasing bandwidth $B_j^i - BT_j^i$. Otherwise, a refresh message with bandwidth $B_j^i$ is sent. FIG. 3 exemplifies a set of pseudocode procedures for performing reservation maintenance, comprising a aggregation procedure 30, AGRA( ); and a distribution procedure 40, DIFFCOMP( ).

The source of a flow sends its refresh message to the ingress node every $T_R$ seconds. At the ingress, all refresh messages of a particular destination are aggregated. When a flow terminates, the source stops sending the refresh messages and the bandwidth reserved for the flow is eventually timed out and released. During the establishment of flow when the signaling message of the flow arrives at i, $B_j^i$ is incremented and an implicit refresh message of that bandwidth is assumed to have arrived. For correct operation, the signaling message must spend no more than $T_R$ seconds at each hop. When a link fails, this information is propagated through the network by the routing protocol, such as OSPF. A source router utilizing the link to support a level of flow immediately terminates that flow. When the network is stable, all overstated and understated reservations will be eventually corrected, provided the refresh messages are never lost. In each refresh period, at most O(N) refresh messages are sent on a link, regardless of the number of flows in the network. This model is scalable, in view of the fact that worst-case bounds on state size depend on the number of active destinations, rather than the number of individual flows. Given that the bandwidth requirements for refresh messages is known a priori, they can be serviced as a separate queue in the link scheduler, and thereby guarantee its bandwidth and bound the delays accordingly. Hence, refresh messages are never lost due to buffer flows as in RSVP; they are lost only due to link failures. In contrast, the number of refresh messages in RSVP is unbounded and depends on the number of flows in the network. In SCORE, reservation information is carried in the packets, so bandwidth provision is made implicitly when flows are established and as a result no reservation information being lost.

Inconsistencies due to link failures are easy to correct, insofar as the routing algorithm informs the sources about link failures whereby the source nodes can terminate all flows that use a failed link and eventually all bandwidth used by those flows is timed out. The sources only need to remember the path utilized by each flow.

In the presence of refresh message losses, the problem becomes increasingly difficult. When a refresh message is lost, the downstream node times out and releases a portion of the bandwidth. In the next cycle, when the refresh message is received correctly, the bandwidth to refresh is greater than the bandwidth reserved. In this scenario diffusing computations are utilized herein to inform upstream nodes of the situation and ask them to release the required bandwidth. In fact, this same or a similar mechanism can be utilized to correct inconsistencies resulting from link failures. The diffusing computation operates as follows. When a node detects an inconsistency in the reservations, it must release upstream bandwidth. It thereby terminates as many flows as possible at the node to satisfy the bandwidth. If there is still some bandwidth to release, it distributes the bandwidth among upstream nodes that send traffic to this node. It then sends RELEASE messages to those upstream nodes, and enters a WAIT state while it pends on receiving ACK messages from the upstream nodes. If further RELEASE messages are received while it is pending in the WAIT state, it immediately sends back an ACK message. After all ACK messages are received, it transits to READY state. If the transition to WAIT state was triggered by a RELEASE message from the downstream message, it sends the ACK message to the downstream node.

A reservation maintenance protocol referred to as "AGgregate REservation Establishment protocol" (AGREE), is provided to manage consistency of aggregate reservations. The correctness of AGRA can be argued informally as follows, wherein a formal proof is omitted for brevity. The refresh algorithm should be such that, after a sequence of link failures and refresh message losses, if no new flows are setup and terminated within a finite time, all reservations must reflect a consistent state, such as all future refresh periods, the refresh messages received by a node for a particular destination must be equal to the reservations made for that destination. All diffusing computations must terminate, because the topology stabilizes and the routing protocol ensures that loop-free shortest paths are established for each destination within a finite time. Note that both the RELEASE messages of diffusing computations and the refresh mechanism in AGRA only decrease the allocated bandwidth, and bandwidths cannot decrease forever. Therefore, there can be no more diffusing computations after a finite time. At this time, the bandwidth specified by refresh messages for a particular bandwidth at all the nodes can only be less than or equal to the reserved bandwidth at that node, otherwise additional diffusing computations would be triggered. If the refresh messages, however, specify a lower bandwidth than the reserved bandwidth then that bandwidth is released. Eventually, all reservations converge to a consistent state. In spite of flow aggregation, delay guarantees can be provided for each individual flow. As a result of using a fluid model assumption, the delay experienced by a flow consists only of the waiting time at the 0-burst shaper at the ingress node and the propagation delays of the links on the flow's path. The delay for the flow is $$\frac{\sigma}{\rho} + \sum_{(i,k) \in P} \tau_{ik},$$

where $\tau_{ik}$ is the propagation delay of link (i, k) and P is the path of the flow. The state size is O(N). The refresh messages on a link are O(N). In a non-fluid model aggregating flows is not as simple as in the fluid model. The next section describes various techniques for merging non-fluid flows.

2. Flow Classes 2.1. Classes based on Packet Sizes (PKT Classes)

Figure 4:
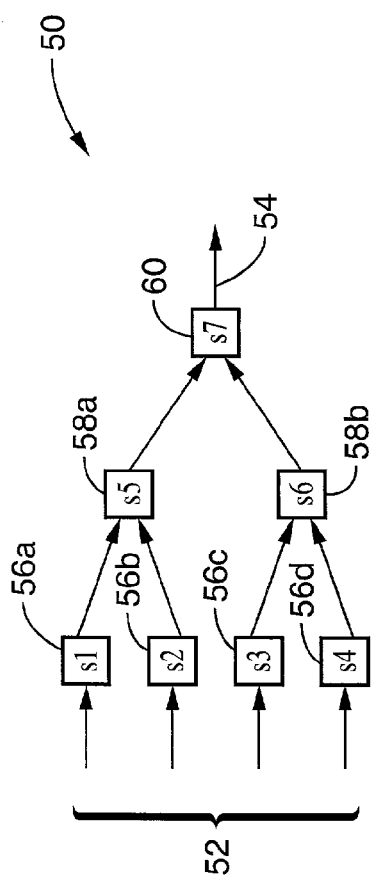
FIG. 4 is a schematic of a shaper-battery according to an aspect of the present invention, showing an arrangement of token-buckets arranged in the form of a tree.

FIG. 4 illustrates a shaper-battery 50 to provide flow aggregation wherein incoming flows 52 are aggregated into outgoing L-burst flow 54. Four shapers 56a through 56d receive and shape the incoming flow, which is aggregated through intermediate shapers 58a, 58b, and a final shaper 60 for final aggregation into flow 54. Recall that, in the system architecture, flows and aggregate flows are always shaped to 0-burst flow before merging with other flows. Similarly, in the non-fluid architecture, flows and aggregate flows are shaped to the form (L,ρ), where L is the maximum size of any packet of the flow and ρ is the rate of the flow or aggregate flow. This form of flow is herein referred to as an L-burst flow, for example the maximum burst is no more than the maximum packet size.

Assume that there are Q classes and a packet size $L_g$ is associated with each class g. A flow belongs to class g if the maximum size of its packets is smaller than $L_g$, but greater than $L_{g-1}$. In the routers, only flows that belong to the same class are merged and the link schedulers process aggregate flows that belong to one of the classes. By providing guarantees to the aggregate flow, the guarantees follow automatically for individual flows in the class aggregate.

Even when flows belonging to the same class are merged, there is going to be burstiness, which must be removed when necessary by reshaping them to an L-burst flow. To study the delays caused by reshaping, consider the following scenario. If a flow f of the form $(L_g, \rho_f)$ is serviced by a WFQ at a link, the delay is given by:

$$\frac{L_g}{\rho_f} + \frac{L_g}{\rho_f} + \frac{L_{\max}}{C} + \tau_{ik} \quad (1)$$

Assume that flow f is merged with n−1 other $L_g$-burst flows, resulting in an aggregate flow with token-bucket parameters $(nL_g, \rho_g)$, where $\rho_g$ is the sum of rates of the participating flows. The delay bound offered by WFQ to the aggregate is then $$\frac{nL_g}{\rho_g} + \frac{L_g}{\rho_g} + \frac{L_{\max}}{C}.$$

However, this delay cannot be used to determine the end-to-end delay bound for the flow f, because flow f may merge with different flows at different times in a dynamic environment. If the aggregate is first shaped to an $L_g$-burst flow before reaching the link scheduler, then the aggregate flow has delay bound of $$\frac{L_g}{\rho_g} + \frac{L_{\max}}{\rho_g} + \frac{L_{\max}}{C},$$

Because $\rho_f \leq \rho_g$, flow f can then use the delay bound of $$\frac{L_g}{\rho_f} + \frac{L_{\max}}{\rho_f} + \frac{L_{\max}}{C}$$

at the link in its computation of end-to-end delay bound. It should be appreciated that at this point delays only need be incorporated to shaping of the aggregate to an $L_g$-burst flow. For this purpose, a device referred to as a shaper-battery is introduced.

Figure 5:
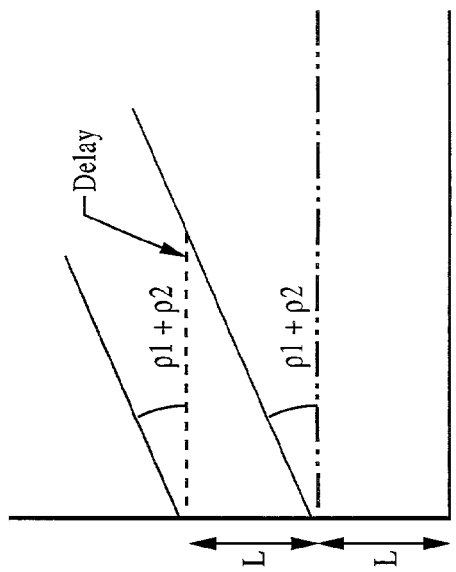
FIG. 5 is a graph of introduced delay in relation to bucket size for the shaper-battery shown in FIG. 4.

It is assumed that the maximum number of flows n, that will ever be aggregated into one flow is known a priori. A straightforward approach for shaping a flow of form $(nL_g, \rho_g)$ to the flow of form $(L_g, \rho_g)$ is to utilize a single token-bucket with bucket size $L_g$ and rate ρ. This introduces a delay in the token-bucket that is at most $$\frac{(n-1)L_g}{\rho_g},$$

as shown in FIG. 5. Again, because $\rho_f \leq \rho$, a bound of $(n-1)L_g/\rho_f$ can be used to compute the end-to-end delay bound for a flow. Problems arise as n becomes sufficiently large wherein this bound becomes very high and is not useful to the end user. The shaper-battery described below reduces this bound to $$\frac{([\log_2(n)] + 1)L_g}{\rho_f}.$$

A shaper-battery is a set of token-buckets arranged in the form of a tree, wherein each token-bucket or shaper has a fixed bucket size of $L_g$, but the rate is dynamically adjustable. A leaf shaper has one input while an internal shaper has two inputs. The rate of an internal shaper is the sum of the rates of its two children. The output of any shaper in the shaper-battery is an $L_g$-burst flow. FIG. 4 shows a shaper-battery of height two which can shape up to four flows to L-burst flow. A shaper-battery of height h can aggregate $2^h$ flows. The shaper-battery is always initialized such that the buckets are set to $L_g$ before any flows are established through the battery. When flows are setup and terminated, the rates of the shapers are adjusted. For example, when a new flow of rate $\rho_f$ is established, one of the available leaf shapers of the shaper-battery is assigned to the flow, the shaper's rate is set to $\rho_f$ and the rate of each of the buckets on the path to the root of the battery is incremented by $\rho_f$. At any internal shaper the maximum delay experienced by a packet is bound by $$\frac{L_g}{\rho_f} \geq \frac{L_g}{\rho_a},$$

where $\rho_a$ is the rate of the shaper. The maximum delay that the packet of the flow faces in the shaper-battery is bound by $$\frac{hL_g}{\rho_f}.$$

As an example, if 65536 $L_g$-burst flows are merged and shaped to an L-burst flow using a single token-bucket, the delay bound is as high as 65535

$$\times \frac{L_g}{\rho_f}.$$

Using the shaper-battery, it is reduced to $$\frac{16L_g}{\rho_f}.$$

The delay bound for the flow can be further reduced, if a minimum rate $\rho_{min}$, for any real-time flow that is assumed. The flow experiences the worst case delay when it merges with traffic with bandwidth $\rho_{min}$, on the other input of a shaper at every hop in the shaper-battery. At the $n^{th}$ stage of the shaper-battery, a flow faces a flow on the other input which has bandwidth of at least $n\rho_{min}$. The delay bound can be reduced to:

$$\frac{L}{\rho_f} \sum_{n=1}^{h} \frac{1}{1+nY} \qquad (2)$$

where $$Y = \frac{\rho_{min}}{\rho_f}.$$

For a flow with rate in $\rho_{min}$, Eq. (2) reduces to $$\frac{L}{\rho_f} \sum_{n=1}^{h} \frac{1}{n+1}.$$

When h=16, it is approximately equal to $$3.18 \times \frac{L}{\rho_f}.$$

This bound will be useful for giving workable delay bounds for low bandwidth flows such as audio flows.

It is not required that all shapers of the battery be created upfront, the shaper-battery can grow dynamically as new flows arrive. However, the limit on the maximum depth of the shaper-battery should be enforced in order to give the delay bound. Each bucket needs an input buffer of size $L_g$. If h is the maximum height of a shaper-battery then it requires at most $2^{h+1}$ buffers of size $L_g$.

2.2. Classes Based on Burst-Drain-Times (BDT Classes)

In the previous section, flows are classified solely on the maximum size of their packets. Another method is now described for defining flow classes based the notion of burst-drain-time (BDT). Given a flow $A_f$ with parameters $(\sigma_f, \rho_f)$, the burst-drain-time $\tau_f$ of the flow is the time to transmit one bucket at the rate of the flow, that is, $$\tau_f = \frac{\sigma_f}{\rho_f}.$$

The flow $A_f$ can alternatively be specified as $(\tau_f, \rho_f)$.

A remarkable property of flows specified using the BDT is that flows with the same BDT can be merged without changing the BDT of the resulting flows. The amount of traffic of flow f that arrives in an interval [τ,t] for this flow is given by:

$$A(\tau,t) \leq (\sigma_f \rho(t-\tau)) \qquad (3)$$

$$A(\tau,t) \leq \rho_f(\tau_f + (t-\tau)) \qquad (4)$$

If two flows $A_1$ and $A_2$ with traffic profiles $(\tau_1, \rho_2)$ and $(\tau_2, \rho_2)$, specified using BDT, merge into a single aggregate flow and $\tau_1 \leq \tau_2$, the amount of traffic that arrives in an interval [τ,t] for the aggregate flow A is given by:

$$A(\tau, t) \leq \rho_1(\tau_1 + (t-\tau)) + \rho_2(\tau_2 + (t-\tau)) \qquad (5)$$

$$\leq (\rho_1 + \rho_2)\left(\frac{\rho_1\tau_1 + \rho_2\tau_2}{\rho_1 + \rho_2} + (t-\tau)\right) \qquad (6)$$

$$\leq (\rho_1 + \rho_2)(\tau_2 + (t-\tau)) \qquad (7)$$

Eq. 7 states that burstiness of the resulting merged flow cannot be greater than the burstiness of the more bursty of the two input flows. Therefore, the resulting merged flow can be characterized by $(\tau_2, \rho_1 + \rho_2)$. The BDT parameter is used to define flow classes as follows: it will be assumed that there are Q real-time classes. With each real-time class g a BDT $R_g$ is associated such that $R_{g-1} < R_g$ and $R_0 = 0$. At the source, a flow with specification $(\tau_f, \rho_f)$ is classified as belonging to class g if its burst-ratio $\tau_f$ is such that $R_{g-1} < \tau_f \leq R_g$. From Eq. 7 it follows that, if two flows belonging to the same class g are merged, then the resulting flow also belongs to the same class g.

Though the preceding description of classes is based on the burst-size of the flow, we actually define classes based on the maximum packet size, of the flow because we assume all flows are shaped down to single-packet size burst at the entrance before merging with other flows. That is, tine BDT of a flow f is defined by $$\frac{L_f}{\rho_f},$$

where $L_f$ is the maximum packet size of flow f.

3. GSAI Architectures

This section presents a series of architectures based on the aggregation technique previously described. Architectures PKT-SP, PKT-MP and PKT-LS use the PKT classes, while BDT-DF, BDT-LS and BDT-MP use the BDT classes. The architectures employ various routing methods: single-path, multipath and label-switched paths. Table 1 serves as a quick reference.

3.1. PKT-SP Architecture

Figure 6:
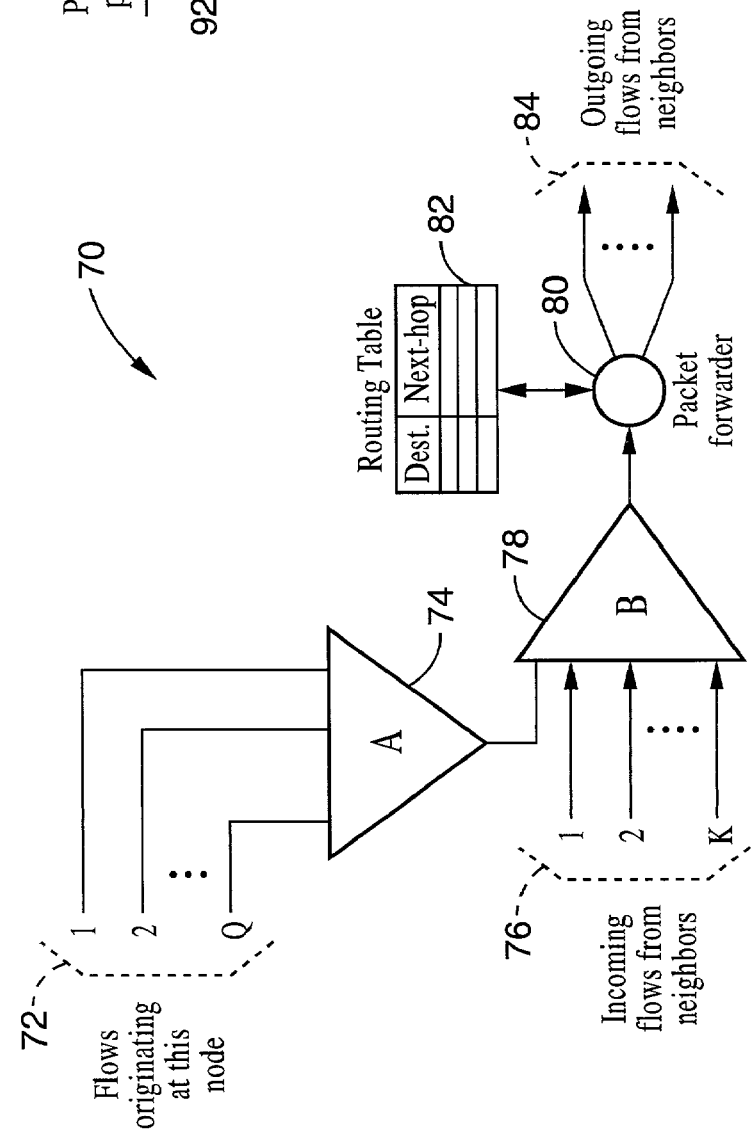
FIG. 6 is a schematic of a PKT-SP architecture according to an aspect of the present invention, shown merging and shaping traffic for a particular destination.

This section presents the first non-fluid architecture PKT-SP, specifically PKT classes with shortest path routing, which closely approximates the system architecture. Except for the non-fluid model assumption and PKT classes, the architecture is essentially the same as the system architecture. At the ingress router, packets are marked with the flow's class tag. In the core routers, all packets of the same destination and class are aggregated. The main challenge is to remove bursts introduced due to the non-fluid nature of flows. FIG. 6 shows the schematic example of the PKT-SP architecture 70 utilized for merging and shaping traffic for a particular destination and class. After merging all flows 72 of a particular destination j and class g that originated at the router, they are shaped to an $L_g$-burst flow using shaper-battery A 74. The output is then aggregated with incoming flows from neighbors 76 using a shaper-battery B 78, with flows of the same destination and class received on the incoming links. The output of shaper-battery B is an $L_g$-burst flow when it reaches the link scheduler 80 which forward the packets. The link scheduler processes traffic on per-destination, per-class basis, and there is one queue for each class-destination pair. Packet forwarding operations are performed in relation to routing table 82 which generates an aggregated outgoing flow 84.

Although the benefits of per-hop shaping can be realized in those proposals, such as reduction in buffer sizes, these benefits are largely undone by the per-flow traffic management that must be employed.

The routing table is of the form $<j,B_j^i,k>$, where j is the destination, $B_j^i$ is the total rate of the traffic arriving at the node with that destination, and k is the next-hop for the destination. Assuming each queue is processed by the WFQ link scheduler at the cumulative rate reserved for the corresponding class-destination pair, the maximum delay experienced by a packet at the link is bounded by $$\frac{2L_g}{B_j^i} + \frac{L_{max}}{C_k^i}.$$

For a particular flow f with rate $\rho_f$ and destination j, $B_j^i$ changes with time though $\rho_f \leq B_j^i$. Therefore, the delay bound $$\frac{2L_g}{B_j^i} + \frac{L_{max}}{C_k^i}$$

at a link can be used for the flow. Because delay bounds have a reciprocal relation to flow bandwidth, tighter delay bounds can be provided under aggregation, but because the delay bounds once offered to a flow at setup time must be valid throughout the lifetime of the flow, the delay bound that is a function of only the flow parameters must be offered. The jitter acquired by the traffic passing through a link is removed at the next hop by the shaper-battery B of the corresponding destination.

The rates of all shapers on the path of a flow are incremented at flow setup by the rate of the flow and similarly decremented at flow teardown. The soft-state maintenance of reservation bandwidth is the same as in the reference model FIG. 3. The admission tests take O(1) time which is much simpler than using conventional admission tests which depend on the reservations already made to other flows and are generally complex. Let f be a flow with path P from i to j and rate $\rho_f$ and let $h_i$ represent the height of the shaper-battery A. The maximum delay experienced in the shaper-battery A is bounded by $$\frac{h_i L}{\rho_f}.$$

The maximum delay experienced in a shaper-battery B of node i is $$\frac{L}{\rho_f}([\log_2(N_i + 1)] + 1).$$

Let $d_{ik}$ be the delay of the link (i, k). Then the maximum delay experienced by this flow is bounded by:

$$d_{ik} = \frac{L_g}{\rho_f} + \frac{L_g}{\rho_f} + \frac{L_{max}}{C_{ik}} + \tau_{ik} \qquad (8)$$

$$D_P = \frac{h_i L}{\rho_f} + \sum_{(m,n) \in P} \frac{L}{\rho_f}([\log_2(N^m + 1)] + d_{mn}) \qquad (9)$$

It will be appreciated that in dense networks, although the number of neighbors of a node can be high, the number of hops tend to be lower at the same time, effectively reducing the end-to-end delays. The above bound is not as tight as the delay bounds obtained using WFQ with per-flow processing.

End-user applications can reduce their delays either by reducing the packet sizes or increasing the reserved bandwidth. Reserving extra bandwidth for each flow, however, tends to waste bandwidth. Instead, extra bandwidth can be allocated on per-class basis. That is, if a queue, such as per-destination, per-label, or per-class, is added to a link scheduler, the queue is serviced at a minimum rate called the threshold rate. When a flow is added to a link and there is no other flow of the same class, a new queue is added to the link scheduler which is processed at the threshold rate. If the total rate for the class exceeds the threshold, the queue is serviced at that rate, otherwise the queue is serviced at the minimum threshold rate. This thresholding technique reduces delay bounds and is especially beneficial to "thin flows," which tend to have very loose bounds.

By using the foregoing thresholding technique, the bound can be reduced for long paths. In thresholding, a queue is always serviced at a minimum rate. For shorter paths WFQ are still better, but the consequence of this should be evaluated with respect to the requirements of the applications. The present aim is not to minimize end-to-end delay bounds, but to provide delays within a "delay limit" that is sufficient to run most real-time applications. For instance, CCITT states that a one-way delay bound of one hundred and fifty milliseconds (150 ms) is sufficient for most voice and video applications. Giving tighter bounds than this would not particularly benefit the users because of the effects of human perception. Therefore, the present aim is to meet the bound of one hundred and fifty milliseconds (150 ms). For shorter paths, the present approach meets that bound though they are looser compared to those of WFQ. Tight delay bounds are, however, useful to reduce the buffer requirements at the receiving router. Experiments will later be described which compare these delay bounds with those obtained from other methods. Classes can be introduced based on the packet sizes. With each class a packet size is associated. At the link scheduler there is per-destination per-class scheduling. The shaper-batteries A and B are on per-destination per-class basis.

3.2. PKT-MF Architecture

The PKT-MP architecture extends PKT-SP to use multiple shortest paths that are computed by OSPF and other recent routing protocols. This improves the use of link bandwidth and improves call-acceptance rates. The complexity of the router is not increased, though PKT-MP provides slightly looser delay bounds than PKT-SP. The key idea, however, is to illustrate how a single flow can use multiple paths for packet forwarding.

Figure 7:
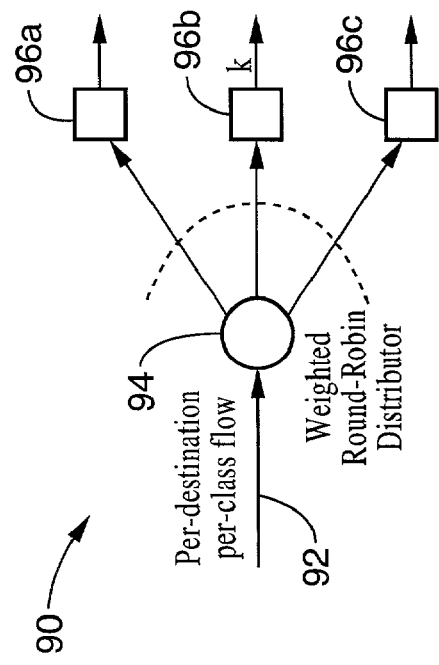
FIG. 7 is a schematic of a packet distributor according to an aspect of the present invention, shown distributing packets from a single flow into token buckets of three outgoing flows.

Let $S_j^i$ be the set of next-hop choices at i that give the shortest distance to j. Packets received by i destined for node j are only forwarded to neighbors in $S_j^i$. Because there can be more than one next-hop at a router for packet forwarding, bandwidth for each of the next-hops must be specified. Formally, let $B_{j,g}^i$ be the total rate of traffic of class g that router i receives, such as from hosts directly connected to it and from its neighbors, that are destined for router j. For each $k \in S_j^i$, let the $B_{j,k,g}^i$ specify the bandwidth that is forwarded to neighbor k. Let $SB_j^i = \{B_{j,k,g}^i | k \in S_j^i\}$. Assuming the network does not lose packets, $B_{j,g}^i = \Sigma_{k \in S_j^i} B_{j,k,g}^i = \Sigma_{k \in S_j^i} B_{j,k,g}^i$. A routing table entry is of the form $<j,g,B_{j,g}^i,S_j^i,SB_{j,g}^i>$. When a router i receives a packet for router j it determines the next-hop k for this packet using a distributor to allocate packets to next-hops in proportion to their bandwidths. FIG. 7 depicts distribution 90 wherein a flow 92 is received by a distributor 94. The flows are distributed across a set of three token buckets 96a, 96b, 96c. The router then puts the packet in the queue j of the link scheduler of the link to k. The time complexity of weighted round-robin discipline used for determining the next hop by the distributor is constant because there are fixed number of neighbors. FIG. 8 depicts an example of pseudocode for performing the above method within a multipath packet forwarding procedure 100. A bounded jitter is introduced by the distributor which can easily be removed using a token-bucket shaper. The rate of the shaper k is given by $B_{j,k}^i$. Packets may arrive out of order at the destination because of multipaths; however, this is not a concern, because end-to-end delay bounds are provided, which can be utilized by the application to detect data losses. It should be appreciated that real-time applications are subject to a required playback time and packets need only arrive in any order within that time frame.

When a flow request of bandwidth ρ is made by an application at the source router i for destination j, the source router selects a valid path using the local link database along any shortest path from i to j that satisfies the bandwidth requirement. It then initiates hop-by-hop signaling to reserve resources along the selected path. If the signaling is successful, for each link (i,k) on the path, $B_{j,k}^i$ and $B_j^i$ are incremented with ρ. Assume the source remembers the path along which the reservation for a flow is made. When a session is terminated, the ingress router initiates a flow teardown procedure. For each link (i, k) on the path, $B_{j,k}^i$ and $B_j^i$ are decremented with ρ. As in the PKT-SP architecture, the reservations are maintained using soft-states. The pseudocode for soft-state refresh is the same as the one in FIG. 3 with line 8 modified to send messages to each k in $S_j^i$ with appropriate bandwidth, instead of a single message. When $BT_j^i \geq B_j^i$, i needs to simply send a refresh message of bandwidth $B_{j,k}^i$ to neighbor k. When $BT_j^i < B_j^i$, a bandwidth of $B_j^i - BT_j^i$ must be released. This excess bandwidth is distributed appropriately among the successors and refresh messages are sent accordingly.

The delay introduced by the shaper of the distributor output can be bound by $$\frac{L_g}{\rho_{min}},$$

where $\rho_{min}$ is the minimum bandwidth of any real-time flow, which must be included in the end-to-end delay bound for the flow. Since the links have different bandwidths, the maximum delay of the paths should be chosen for computing end-to-end bound. Let $\delta_j^i$ be the delay bound from node i to node j, wherein $\delta_j^i$ can be recursively defined as:

$$\delta_j^i = \frac{L_g}{\rho_{min}} + \text{MAX}\{d_{ik} + \delta_j^k | k \in S_j^i\} \quad (10)$$

where $d_{ik}$ is as Eq. 9. An end-to-end delay bound for the flow is given by:

$$\frac{h_i L_g}{\rho_f} + \delta_j^i \quad (11)$$

The architecture in PKT-MP differs from the PKT-SP architecture in the use of multipaths. All flows with a particular destination j are aggregated and they collectively share the bandwidth allocated on links for j. A key benefit of establishing flows along the multiple paths is that the routing state is still O(N), where N is the number of nodes in the network. The advantage of this approach is that the state in the routers is not increased when a new flow is established. The state size is defined by the network topology, rather than user flows. The number of refresh messages on a link is bounded by O(N).

So far, only those neighbors that offer the shortest distance to the destination were considered for packet forwarding. However, if the neighbors that are equidistant but have "lower" address, are added to the $S_j^i$ then better call-acceptance rates can be achieved. The routing paths will still be free of loops in this case.

Note that PKT-MP uses only a class field that can be encoded in the DS field of the IP header and leave all other fields untouched. In contrast, SCORE reuses some fields in the IP header, which are described in more detail later.

3.3. PKT-LS Architecture

In the PKT-SP and PKT-MP architectures, flows are always established along the shortest paths. To lower call-blocking rates, the architecture must allow the user to setup flows along any path between a source and a destination, as determined by a QoS path-selection algorithm. The challenge is to do this without using per-flow state. Described within the present invention is a method of using Multi- Protocol Label-Switching (MPLS) for setting up the flows along any arbitrary path while replacing per-flow state with a much smaller aggregated label state. Such techniques have been previously proposed for Diffserv, but they have not been adequately applied in the Intserv context.

In a label-switching scheme, the packets are assigned labels which have specific interpretation in the receiving router. In the scheme, a label is used to uniquely represent a path between a pair of routers. It is based on the principle that, if two packets received by a router have the same label, then they must follow the same path starting from the router to the destination. Packets with the same label may belong to different flows and may be received from different neighbors, but the routers process them identically based only on their label. Formally, let label v represent a path P from router i to destination j. Let k be the neighbor of i on the path P. Let u be the label of the path from k to j at k. Then for i to forward a packet with label v along P, all it needs to do is replace the label with u and hand it over to the neighbor k. To an application that wants to use path P, router i returns the label v, which the application must use to mark its packets.

For example, in a node diagram 110 of FIG. 9, all packets that router B receives having the same label are forwarded along the same labeled switched path from B to A. A consequence of the path aggregation is that, if two flows with paths C B and D B share a common suffix subpath B A, only one routing table entry need be maintained for these two flows at each router in the suffix-path B A. In the same situation, flow setup that does not use aggregation, such as in virtual circuits, would create two entries in the routing table.

The routers maintain state on per-label basis instead of per-destination. Though per-label state is larger than per-destination state, it is significantly lower than per-flow state. Representative figures on state sizes are provided later in the description.

FIG. 10 depicts a fragment of pseudocode 120 as an example of soft-state refresh which is performed on per-label, per-class basis. An entry in the refresh message carries a label and the bandwidth for that label. Let the refresh messages received at i for label v specify a total bandwidth of $BT_v^i$. In comparing $B_v^i$ with $BT_v^i$; if $BT_v^i$ is less than $B_v^i$ it means that the router can release some allocated bandwidth equal to $B_v^i - BT_{vi}$. The refresh messages for bandwidth $BT_v^i$ and label u are sent accordingly, to neighbor k associated with label v; otherwise $B_u$, is sent in the refresh message.

The rest of the architecture is quite similar to the PKT SP architecture. PKT-LS can be viewed as a generalization of PKT-SP where the destination address is replaced with labels. In PKT-SP the link scheduler performs per-class per-destination scheduling, while in PKT-LS it processes flow aggregated on per-class per-destination basis. The routing table stores the total bandwidth for that label. A routing table entry is of the form $(v,g,B_{v,g}^i,k,u)$, where $B_{v,g}^i$ is the rate of the traffic arriving at the node with label v. At the ingress, all flows with the same label are merged using a shaper-battery; there is one shaper-battery per label. Similarly, in the core routers there is also one shaper-battery per label to shape incoming traffic from the neighbors. The flow establishment is the same as in PKT-SP, except that the flow receives a label from the ingress router-that it must use to mark its packets. The delay bound is the same as in Eq. 9, where P is now a labeled path instead of the shortest path as in PKT-SP.

The architecture of PKT-LS is more efficient in terms of network bandwidth usage which is reflected in a higher call-acceptance rate. This gain comes at the cost of a larger state in the routers. Because of the use of labels the total number of labels that have to be maintained at a router is greater than O(N). However, the benefits of aggregation can be seen from the fact that the amount of label state is significantly less than per-flow state and only a few times larger than per-destination state and hence, resource provisioning to prevent refresh message loss can be incorporated. From experiments, it has been found that the size of the label state is only few times the number of nodes in the network.

3.4. BDT-DF Architecture

The BDT-DF architecture is similar to PKT-LS is all respects, except that it eliminates the use of the shaper-battery by using BDT classes instead of PKT classes. Each flow-is shaped to an $(L_f, \rho_f)$ flow at the ingress node. The flow's BDT is determined at the ingress node and each packet of the flow is marked with that class. A field in the packet specifies the class of the flow. At the links, all packets belonging to the same class are aggregated into a single flow, irrespective of the flow to which they belong. Thus, there are Q queues at each link serviced by a WFQ. There is no per-flow state maintained by the schedulers; only the total bandwidth currently allocated to each Q classes, is maintained for use by the admission control. The per-packet processing is a constant time operation.

A routing table entry is of the form $<v,g,B_{v,g}^i,k,u>$. When a packet with label v and class g is received, its label is used to determine the next hop neighbor k and the label v to substitute. The packet is placed in the queue g of the link to k. The rate for class g on the link (i, k) is the sum of the rates of all labels for which k is the next hop. Note that, unlike PKT-LS, there is only per-class queue in BDT-DF.

The jitter introduced by the scheduler in the aggregate flow is removed at the next router by reconstructing it to have same the pattern it had before entering the link. By reconstructing the aggregate flow, the flows comprising the aggregate can be extracted without destroying their class identity. At the next link, flows can then be merged with other flows of the same class. To shape traffic, conventional techniques may be employed, however, the shaping provided is for the aggregate flows. This is achieved using a regulator and delay-field in the packets as follows. The delay bound for a packet of class g with cumulative rate of $\rho_g$ at a link (i, k) is given by:

$$\theta = \tau_g + \frac{L_{max}}{\rho_g} + \frac{L_{max}}{C_{ik}} + \tau_{ik} \qquad (12)$$

Figure 11:
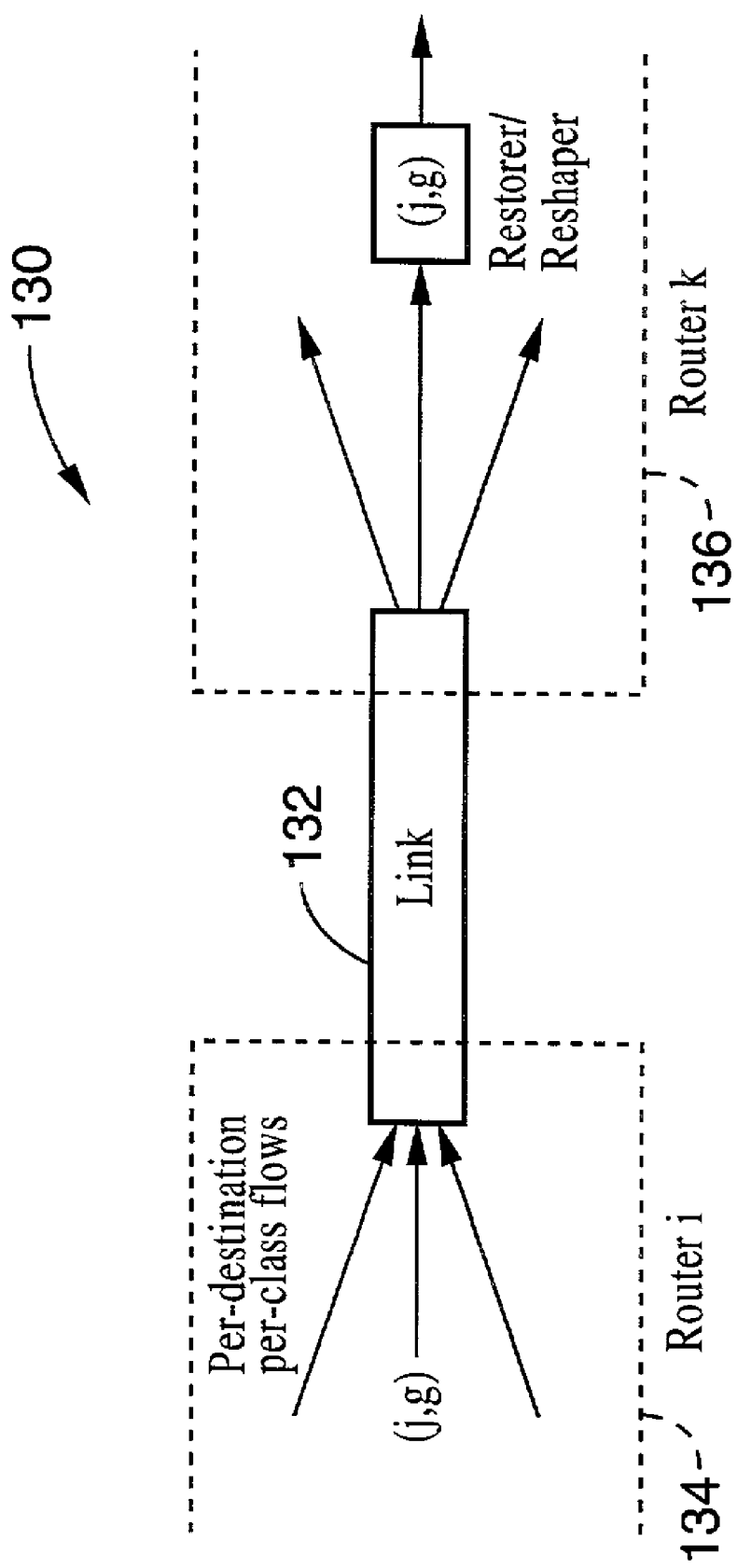
FIG. 11 is a schematic of a regulator according to an aspect of the present invention, shown shaping aggregate flows at a receiving end.

Each packet is delayed by an arbitrary amount but never more than the maximum delay θ. FIG. 11 depicts regulation 130 over a link 132 from router i 134, to router j 136.

The regulator simply delays packets arriving early so that the total delay is θ and the flow is restored to the pattern it had before entering the schedule. Let the aggregate flow entering the real-time queue be characterized by $(\tau_g, \rho_g)$. If θ' is the actual delay experienced by a packet in the scheduler, the regulator delays the packet by θ−θ'. The delay θ' is obtained from the time stamp when the packet enters the scheduler and the time when it is received by the regulator. Each packet emerging out of the regulator is therefore delayed by a total amount of θ, and the output of the regulator has a characterization that is identical to the input to the scheduler, wherein the output of the regulator has class g. As a result of each individual flow belonging to class g before aggregation, each individual flow contained in the aggregate flow conforms to g after passing through the regulator. The flow contained in the output of the regulator can therefore be freely merged with other flows of the same class entering the node via other links. Current literature in the field describes the efficient implementation of regulators using calendar queues.

It is important to clarify that we cannot simply reshape the traffic, using a token bucket, to conform to class g. A regulator should be utilized because flows with different labels are merged into same class queue at the next router, wherein packets merged into the same class may go to different routers. The aggregate flow must be reconstructed to have the same the pattern it had before entering the link.

At any link (i, k), a flow of class g packets experiences at most $$\tau_g + \frac{L_{\max}}{\rho_g} + \frac{L_{\max}}{C_{ik}} + \tau_{ik}.$$

Since $\rho_f \leq \rho_g$, the end-to-end delay bound for a flow with path P is as follows:

$$\sum_{(i,k) \in P} \tau_g + \frac{L_{\max}}{\rho_g} + \frac{L_{\max}}{C_{ik}} + \tau_{ik}$$

The refresh mechanism is identical to one in PKT-LS. The architecture eliminates the use of shaper-batteries. The link-scheduler complexity is O(Q). The admission control only has to ensure that the total allocated bandwidth for real-time does not exceed C or some policy determined limit. The delay-field is an added overhead that consumes bandwidth. The architecture in the next section shows how this field can be removed.

3.5. BDT-LS Architecture

Architecture BDT-DF uses the delay-field and the regulator to remove jitter introduced by the link schedulers. The delay-field consumes extra bandwidth. The delay-field is primarily used by the regulator for "restoring" a flow to the form it had before entering the link at the previous hop. In BDT-LS, by contrast, the aggregated-flow is only "reshaped", using a token-bucket ($\tau_g \rho_g, \rho_g$) to belong to class g instead of completely restoring. In BDT-DF just reshaping would not be useful, because the flows aggregated into a class can be going to different destinations and individual flows extracted may then not belong to the same class and cannot readily be mixed with other flows. For this reason, in BDT-DF a regulator is used with the help of a delay field to restore the flow to the original shape. In BDT-LS, instead of using a delay field and a regulator, the link scheduler is expanded to process flows on a per-class, per-label, basis instead of per-class scheduling as in BDT-DF. It will be appreciated, therefore, that packets with same label and same class are aggregated into a queue at the link scheduler. There is one token-bucket per-label per-class for each incoming link with parameters ($\tau_g \rho_{v,g}, \rho_{v,g}$) where $\tau_g \rho_{v,g}$ is the rate of traffic with label v and class g. The link scheduler processes at most QV queues, where V is the number of labels in the routing table.

The refresh mechanism and refresh overload are same as in BDT-DF. The delay bounds are also identical to those in BDT-DF. The refresh overload is again the same.

The advantage of BDT-LS is in eliminating the use of the delay field. The label and the class of the packets, however, are necessary. The obvious disadvantage is that the number of queues is increased from O(Q) to O(QV). This should not be a matter of concern because the complexity is largely determined by the network parameters rather than user request count.

3.6. BDT-MP Architecture

It should be appreciated that BDT-MP is similar to PKT-MP except that it uses BDT classes instead of PKT classes. The use of a shaper-battery and the label field is eliminated using BDT-MP.

A routing table entry is identical to that of PKT-MP. A distributor is used as in PKT-MP which works on per-destination per-class basis just as in PKT-MP. Like PKT-MP, BDT-MP uses no extra field except the class field. The soft-state mechanism is same as in PKT-MP.

The link scheduler processes packets aggregated on the basis of destination and class just as in PKT-MP. The link scheduler processes at most QN queues. The jitter introduced by the link schedulers is removed using a token-bucket shaper as in BDT-LS. There is again no need for using a regulator because all packets aggregated into the same queue are destined to the same router and hence no delay field. However, the distributor introduces extra burst that is at most $L_{max}$, which in PKT-MP was only $L_g$. The jitter introduced by the distributor which is again removed using a token-bucket shaper with parameters ($\tau_g B_{j,k,g}{}^i$, $B_{j,k,g}{}^i$). The delay introduced by the shaper of the distributor output can be bound by $$\frac{L_g}{\rho_{\min}},$$

where the $\rho_{min}$, is the minimum bandwidth of any real-time flow. The end-to-end delay bound can be recursively defined as follows:

$$\delta_j^i = \tau_g + \frac{L_{\max}}{\rho_{\min}} + \text{MAX}\left\{\frac{L_{\max}}{C_{ik}} + \tau_{ik} + \delta_j^k \mid k \in S_j^i\right\} \qquad (13)$$

3.7. AGREE Protocol

The goal of the "AGgregate REservation Establishment" protocol (AGREE) is to maintain the consistency of reservations. If at each router i for all destinations j and classes g, $\Sigma_{k \in S_j^i} B_{j,g,k}{}^i = \Sigma_{k \in S_j^i} B_{j,g,k}{}^i + I_{j,g}{}^i$, then reservations are said to be in a consistent state. Pseudocode which exemplifies an embodiment of AGREE is shown in FIG. 12 as an AgreeEvent( ) procedure 150 and a DiffComp( ) procedure 160. The AGREE protocol utilizes soft-states in a similar manner to RSVP and YESSIR, yet, because the reservation state is on a per-destination, per-class basis, its reservation refresh messages are predicated on a per-destination per-class basis. Every $T_R$ seconds, which is set as the refresh time period for each destination j and g, the router i invokes AgreeEvent(TIMEOUT, j, g, -, -) for comparing the cumulative reservations of the incoming refresh messages with the current reservations and sending its own refresh messages. A refresh message specifies the destination j, class g and the associated bandwidth b. The source node of each flow sends its refresh messages to the ingress node every $T_R$ seconds, stating its destination, class and its rate. At the ingress node all refresh messages of a particular destination and class are aggregated and a single refresh message is sent to the next-hop. When a flow terminates, the source stops sending its refresh messages and the bandwidth reserved for the flow is eventually timed out and released in the network. The core refresh cycle is shown on lines 02–13 of the pseudocode in FIG. 12. Let the reserved bandwidth on the outgoing links in $S_j^i$ for class g add up to bw.

Let the refresh messages received by router i for destination j from neighbors not in $S_j^i$ and refresh messages originating at the router, during the previous refresh period add up to a total bandwidth of bt. Note that the refresh messages originating at the router itself add up to $I_{j,g}^i$. First, bt is compared with bw, and if bt=bw, the reservations are in a consistent state and there is no need to release bandwidth. The router simply sends a refresh message to each next-hop $k \in S_j^i$, with current allocated bandwidth $B_{j,g,k}^i$.

Reservations can become inconsistent, such as when bt≠bw, due to flow terminations, link failures, control message losses, and similar occurrences. To correct the inconsistencies two separate cases are considered: (1) bt<bw, and (2) bt>bw. The first case is handled by lines 6–9 and 12 of the pseudocode in FIG. 12. The total incoming bandwidth bt is first divided into $b_1, \ldots, b_{S_j^i}$, such that for each $k \in S_j^i$, $b_k \leq B_{j,g,k}^i$, and then for each $k \in S_j^i$, $B_{j,g,k}^i$ is updated with $b_k$ and a refresh message is sent to k with the new bandwidth $b_k$. The second case, wherein bt>bw is generally more difficult, and requires forcing the upstream routers to reduce their outgoing bandwidth. Two methods are described for correcting this inconsistency. The first method uses the fact that the underlying routing protocol (such as OSPF) informs all routers about link failures. When a router learns about a failed link, it terminates all flows that use that link. The soft-state refresh mechanism will then eventually release the bandwidth reserved for these flows using the same process outlined to handle case (1). A router is only required to remember the path of each flow that originates from it.

The second method uses a diffusing computation to correct the inconsistencies. When the router i detects failure of adjacent link (i, k) it invokes AgreeEvent(RELEASE, j, g, k, $B_{j,g,k}^i$) for each j and g. The router updates $B_{j,g,k}^i$ (line 15) and invokes DiffComp( ) if it is in a PASSIVE state. The DiffComp( ) procedure first terminates as many flows as possible at the router, and if there still exists bandwidth which should be released to restore consistency, the router distributes the excess bandwidth among upstream neighbors and requests them, using RELEASE messages, to reduce sending required traffic to this router (lines 31–34 ). The router then enters ACTIVE state indicating that it is waiting for the upstream nodes to reply with ACK messages. When an upstream router receives a RELEASE message it repeats the same process. If a router receives RELEASE messages from successor nodes while in the ACTIVE state, it immediately sends back an ACK message (line 18). After all ACK messages are received, it transits to PASSIVE state (line 21) and if the transition to ACTIVE state was triggered by a RELEASE message from the downstream message, it sends the ACK message to the successor node that triggered the transition to ACTIVE state (line 22). When flow-setup and terminate messages are received, they are simply forwarded to the next hop after the reservations are modified.

During routing-table convergence, stray release messages may arrive from current upstream nodes, which are safely ignored by immediately sending ACK messages even when the router is in PASSIVE state. Similarly, the refresh messages received from downstream nodes and duplicate refresh messages are ignored. When a neighbor k is added or removed from a successor set, the corresponding $B_{j,g,k}^i$ are reset for each j and g. Although not explicitly stated in the pseudocode, it will be appreciated that before initiating the diffusing computation, an attempt may be made to reserve the required bandwidth through a new request wherein the diffusing computation is only triggered for execution subject to request failure.

The AGREE protocol can be said to work correctly if after a sequence of link failures and refresh message losses, and if no new flows are setup and terminated, within a finite time all reservations reflect a consistent state. For correct functioning of the protocol, it is assumed that messages on a link are received and processed in order. Abiding by this condition prevents race conditions between flow setup, terminate, refresh, and release messages. It will be appreciated that the topology stabilizes within a finite time and the routing protocol will ensure that loop-free shortest paths are established for each destination, wherein all diffusing computations terminate, and all routers return to PASSIVE state for each class-destination pair. In the AGREE protocol, the release messages and the refresh messages only operate to decrease the reserved bandwidths. Since bandwidths are not subject to continuous decrease forever, after a finite time no new diffusing computations will be initiated, at which time the bandwidth specified by refresh messages at all the nodes for a particular bandwidth can only be less than or equal to the reserved bandwidth at that node, otherwise this will again trigger another diffusing computation. If on the contrary, refresh messages specify lower bandwidth than reserved bandwidth, then that extra bandwidth is eventually released by the usual timeout process of case (1). Therefore, the protocol assures that eventually all reservations must converge to a consistent state.

Up to O(QN) refresh messages are sent on a link within each refresh period, irrespective of number of flows in the network. Since the bandwidth requirements for refresh messages is known a priori, they can be serviced through a separate queue in the link scheduler and guarantee a delay bound. So refresh messages are never lost due to queuing delays. This is not possible in per-flow architectures as the number of flows on a link cannot be determined a priori. In AGREE, they can only be lost due to link failures, which in backbone network is relatively rare. Even then, the AGREE protocol is more resilient to refresh message loss compared to a per-flow architecture. In per-flow architectures a lost refresh message cannot be distinguished from flow termination and the router interprets a lost refresh message as a flow termination and attempts to release bandwidth from downstream links. In the following cycle when the refresh message is received correctly, it tries to recover the released bandwidth. In contrast, in AGREE, a link can simply use a null refresh message when it does not carry any traffic for a particular destination and class. This enables distinguishing flow termination from refresh message loss. When a periodic refresh message is lost, the receiving node recognizes it and continues to use the contents of the refresh message of the previous cycle. In the following cycle, if a refresh message is received correctly, the new refresh message is utilized. In essence, refresh messages are sent irrespective of the presence of flows in a synchronous manner which is only possible because AGREE's reservation state is based on network parameters. It should be appreciated that the described AGREE model and variations thereof provide scalability because the worst case bounds on state size depend on the number of active destinations and classes rather than the number of individual flows.

4. Comparison of the Architectures

This section makes a comparative study of our architectures with the Intserv and SCORE architectures in terms of delay bounds, bandwidth utilization, and control overhead, obtained in the various architectures.

4.1. Delay Bounds

The end-to-end delay bound in PKT-SP and PKT-LS as given by Eq. 9 is loose compared to the delay bound achieved via WFQ in per-flow architectures. This is mainly due to the delays introduced by the shaper-batteries. It has been illustrated how the delays can be improved using the described thresholding technique. Following are experiments which test the resulting delay bounds of the architectures.

Consider a network in which a node has at most 31 neighbors, so that the shaper B can be restricted to have a depth of 5. Each of the links is assumed to have 1 Gbs capacity. For simplicity, propagation delays are ignored in all the experiments. The packet sizes can range from 100 bytes to 1000 bytes and flow bandwidths range from 64 Kbs (audio) to 3 Mbs (video). The threshold is set at 5 times 64 Kbs. Assume 64 Kbs is the minimum bandwidth of any flow. The threshold rate used is 10 times the rate for an audio flow. The delay-bounds are plotted for various architectures as function of path length.

Figure 13:
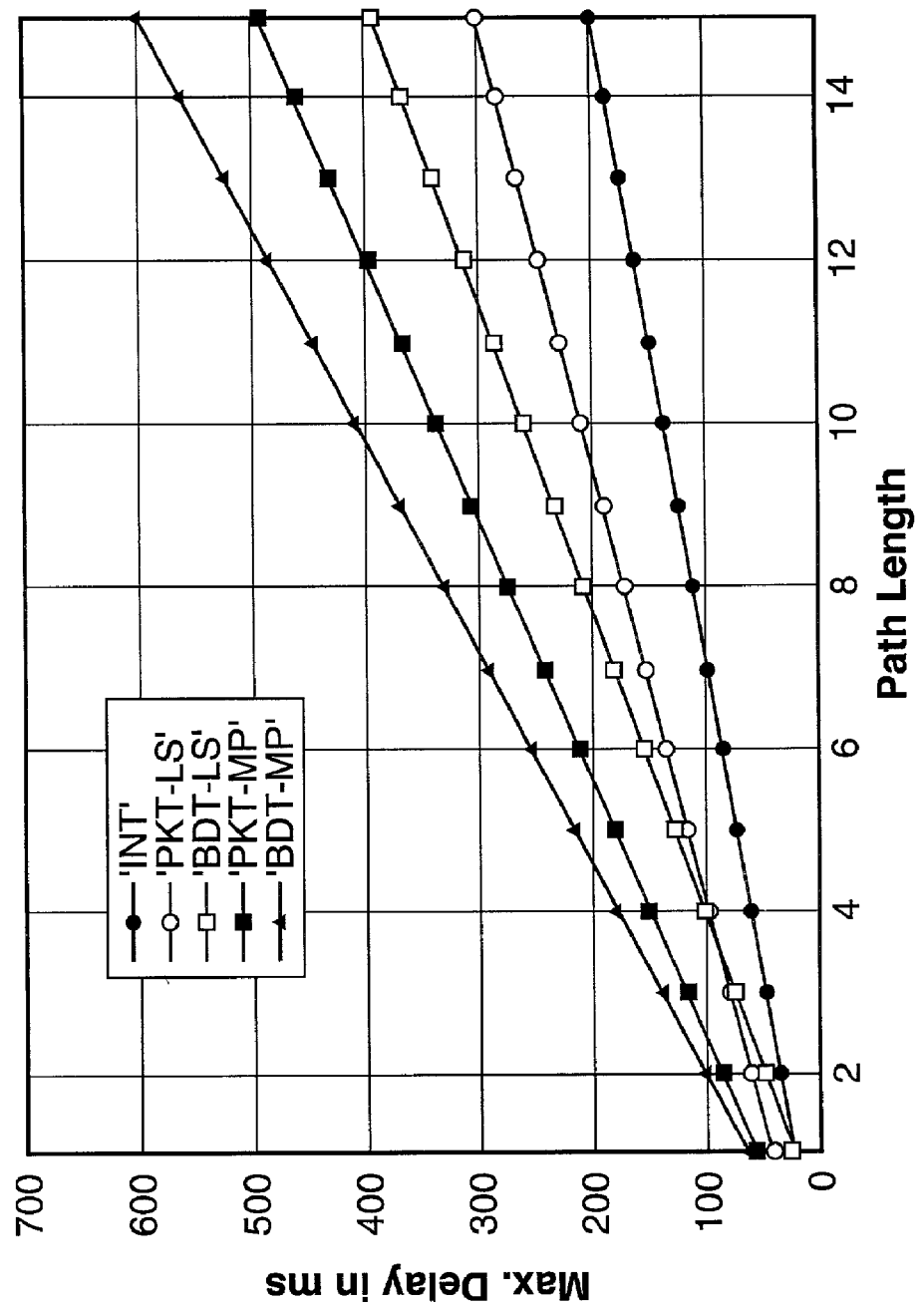
FIG. 13 is a graph of delay for packets of variable length in response to path length for a number of architectures, shown for an audio flow bandwidth range.
Figure 14:
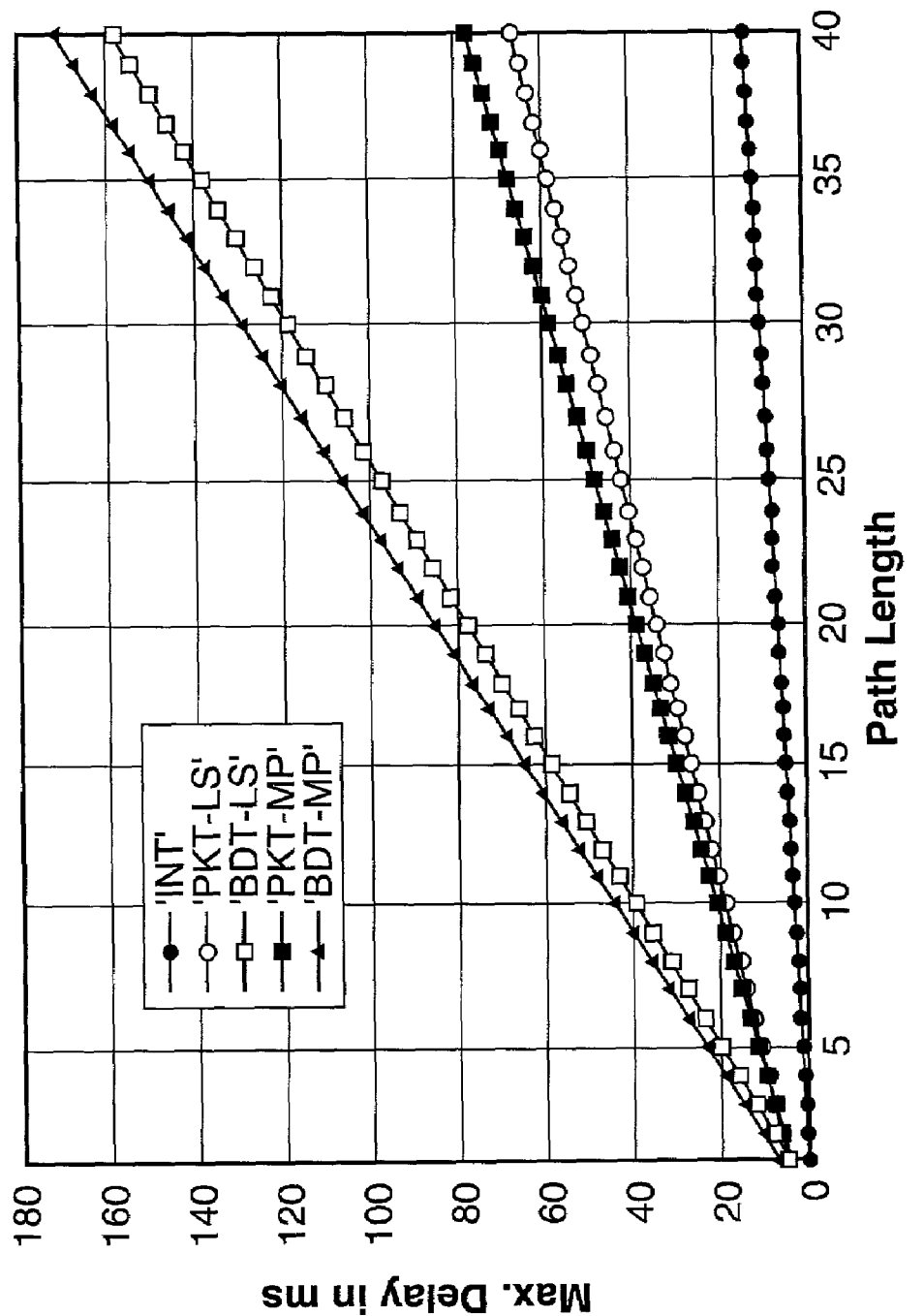
FIG. 14 is a graph of delay for packets of variable length in response to path length for a number of architectures, shown for a video flow bandwidth range.

FIG. 13 and FIG. 14 represent a comparison of delays for variable length packets in response to path length associated. FIG. 13 illustrates a graph of variable length packets subject to an audio bandwidth of 64 Kbs, while FIG. 14 illustrates a video bandwidth of 3 Mbs.

Figure 15:
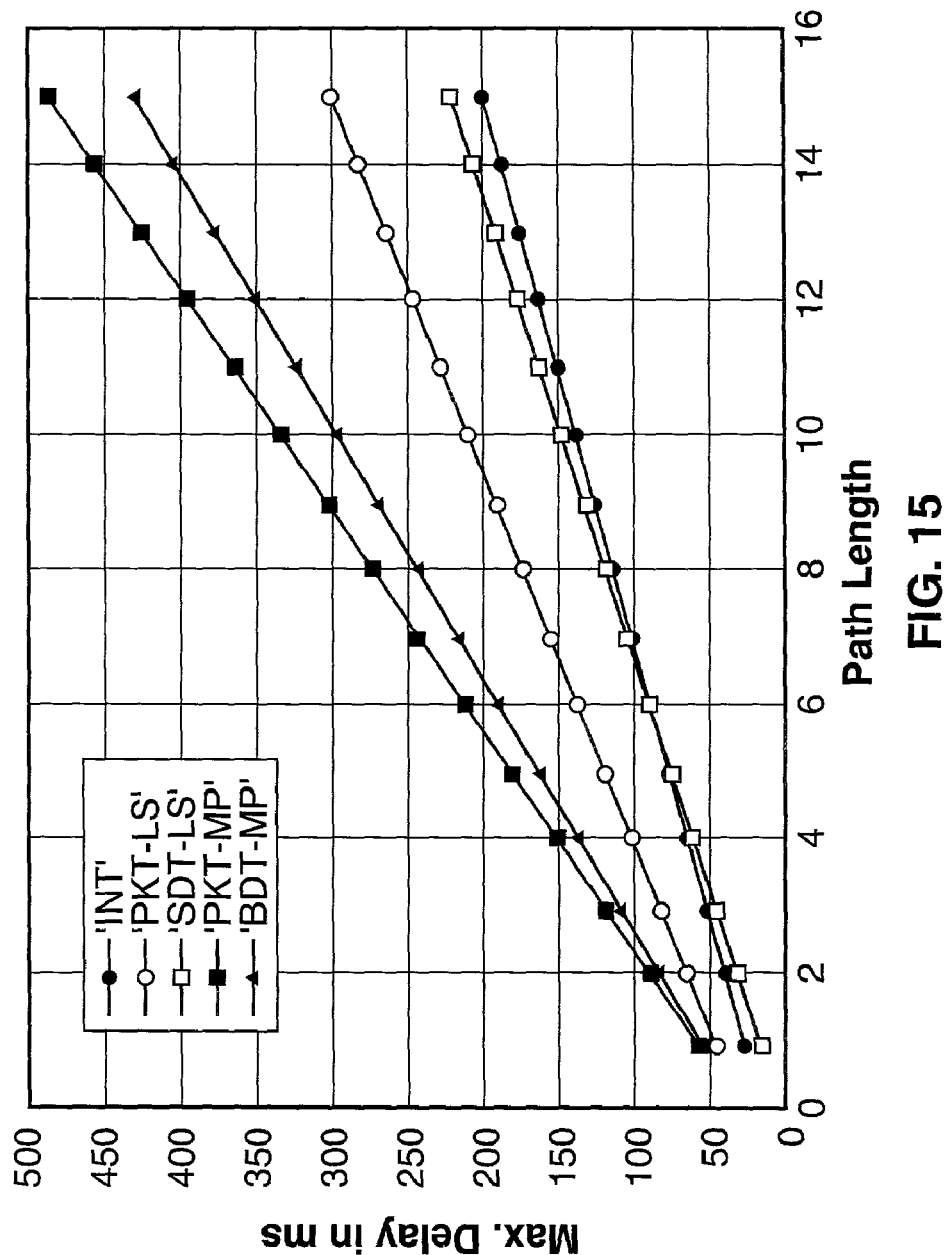
FIG. 15 is a graph of delay for 100 byte packets in response to path length for a number of architectures, shown for an audio flow bandwidth range.
Figure 16:
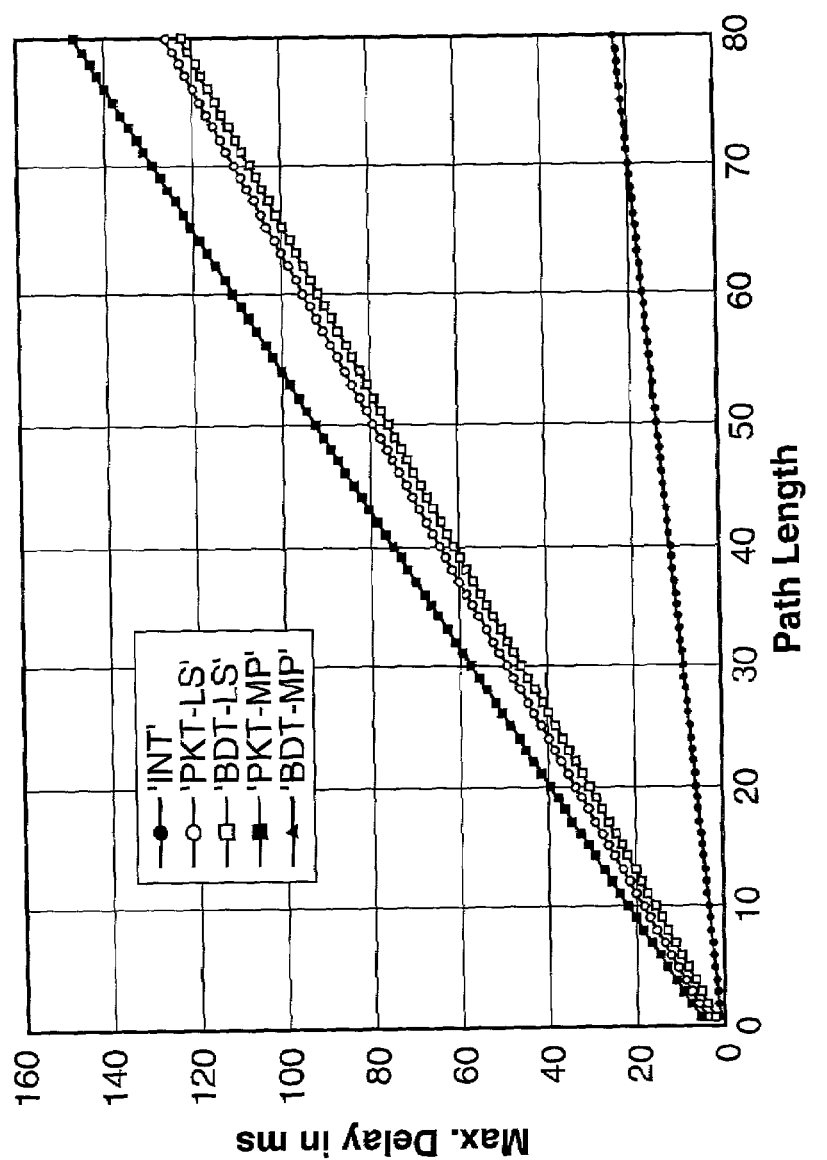
FIG. 16 is a graph of delay for 100 byte packets in response to path length for a number of architectures, shown for a video flow bandwidth range.
Figure 18:
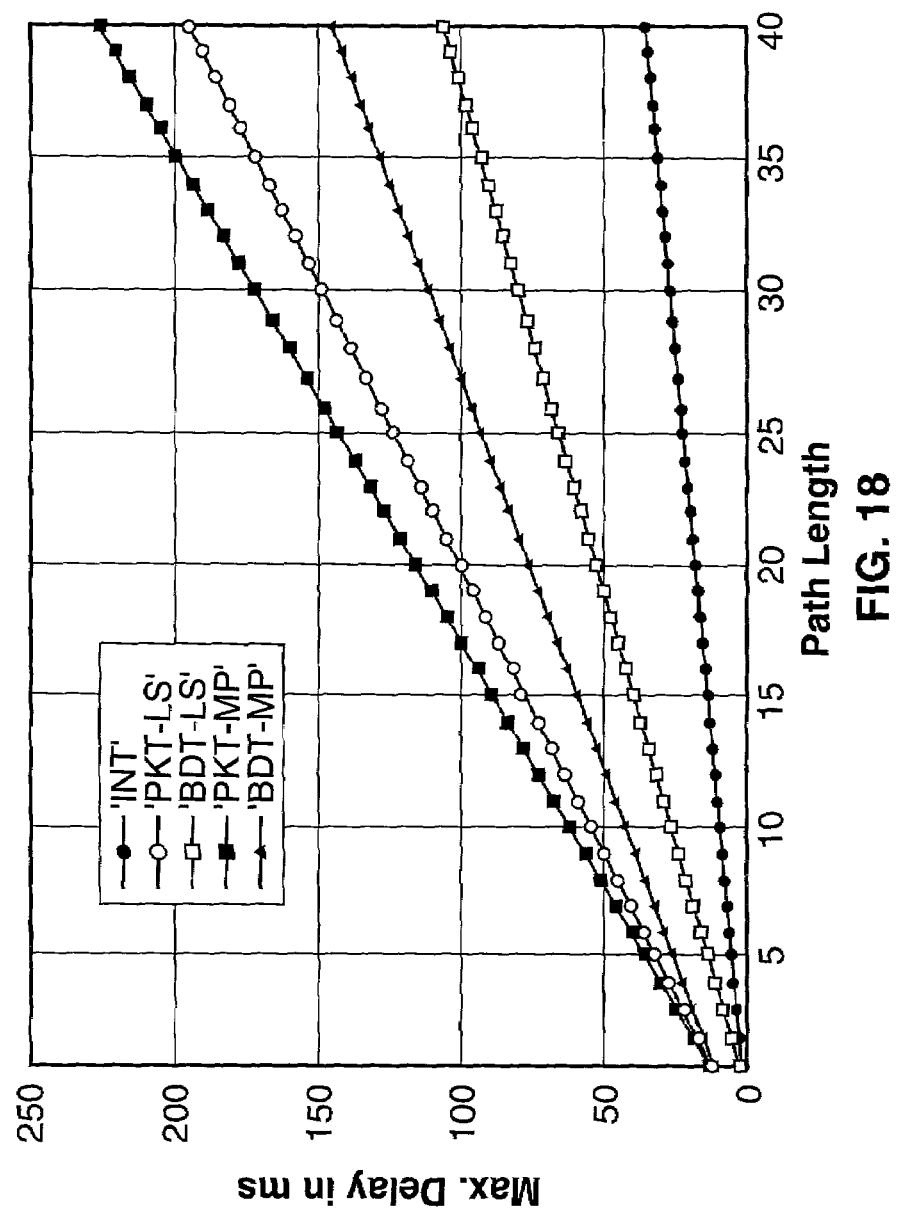
FIG. 18 is a graph of delay for 300 byte packets in response to path length for a number of architectures, shown for a video flow bandwidth range.

It will be appreciated that high bandwidth applications, such as shown in FIG. 16 and FIG. 18, are less prone to lengthy delay limits and more apt to meet the delay limit of one hundred and fifty milliseconds (150 ms ). This is because the relation between end-to-end delay and bandwidth is reciprocal. As mentioned earlier, CCITT states that a one hundred and fifty milliseconds (150 ms ) end-to-end delay is sufficient to support most real-time applications. This assumption goes forward with the focus on meeting this limit of 150 ms rather than beat the tight bound given by WFQ. In FIG. 14 and FIG. 15 when packets are of fixed length of 100 bytes and 300 bytes per-flow, WFQ performed significantly better than the other two, but the fact that fairly large path lengths are within the 150 ms bound for all the architectures does not give particular advantage to the per-flow approach.

Figure 17:
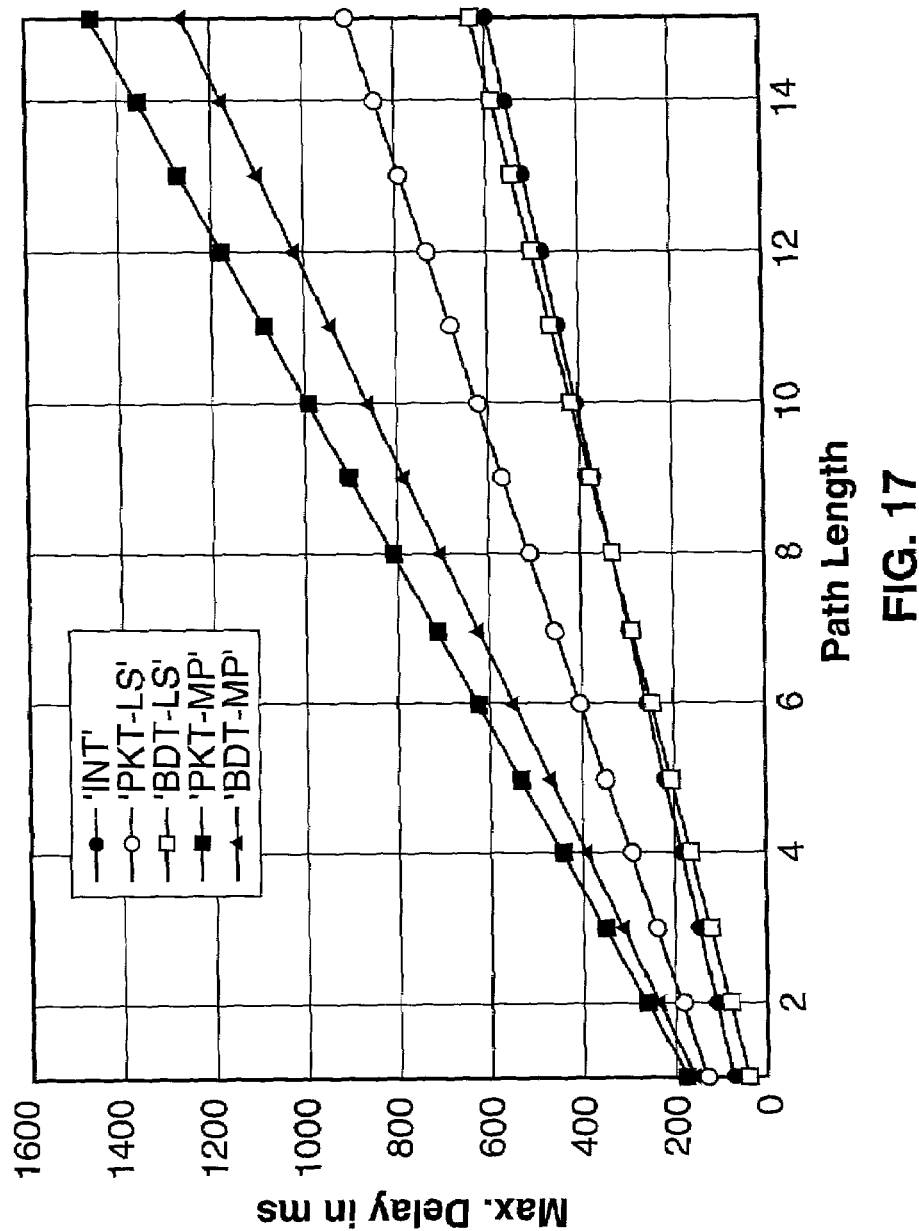
FIG. 17 is a graph of delay for 300 byte packets in response to path length for a number of architectures, shown for an audio flow bandwidth range.

For low bandwidth applications when packets are of fixed size, per-flow WFQ is no better than the other applications as shown in FIG. 15, and FIG. 17. For audio, using large packet size of 1000 bytes, even per-flow VTFQ cannot provide the delays needed for real-time communications, as shown in FIG. 15. However, when the flow's packets are bound by 100 bytes and the maximum packet size in the network is 1000 bytes, the delays of per-flow WFQ are quite large and not useful (refer to FIG. 15). The GSAI architecture illustrated enhanced performance in relation to WFQ when the packets in the network were of different sizes. The delay in WFQ is dominated by the maximum packet size, whereas PKT-SP and BDT-DF through "thresholding" can remove the ill-effects of large packets and improve the end-to-end delays.

It will be appreciated that SCORE generally achieves the same delays as per-flow WFQ. Using the threshold approach, GSAI can yield a delay reduction for low-bandwidth flows with long paths compared to per-flow WFQ. For shorter paths, the delay bounds tends to be within 150 ms. Initial experiments on the method indicate that the delay bounds for flows are as good as, or even better in some cases, than per-flow WFQ.

4.2. Bandwidth Utilization

Both SCORE and GSAI architectures have their sources of bandwidth loss. In SCORE, some link bandwidth is lost due to estimation errors, whereas in the GSAI architectures the loss is due to thresholding. When the network is sufficiently and uniformly loaded, the reservations easily exceed the thresholds and there is minimum waste of bandwidth. Thresholding has adverse effect when a link carries a large number of low-bandwidth flows that belong to different flow classes. In SCORE, there is a bandwidth loss of approximately 10–15%.

It should be appreciated that link bandwidth usage estimates are primarily utilized for admitting new flows, wherein call-blocking rates are a good indication of the effect of bandwidth losses. An experiment was conducted to measure the call-blocking rates of PKT-LS, BDT-DF, Intserv and SCORE. The call-blocking rates were not compared with other architectures, because they do not allow arbitrary paths to be setup and the resulting call-blocking rates are not true indications of the effects of thresholding.

The experiment was performed by generating random flow requests in a network and the widest-shortest algorithm was utilized to select a path between the source and destination. The reservation is then made on each link on the path. For PKT-LS, when the flow is the first flow with that destination and class, the bandwidth used is increased by the threshold. Similarly for BDT-DF, if the flow is the first flow of that class, the threshold bandwidth is reserved. In SCORE, the estimation algorithm is not implemented, but an assumption is made that 10% of the bandwidth is lost on each link. That is, the link bandwidth is manually reduced by 10% when performing the experiment.

Figure 19:
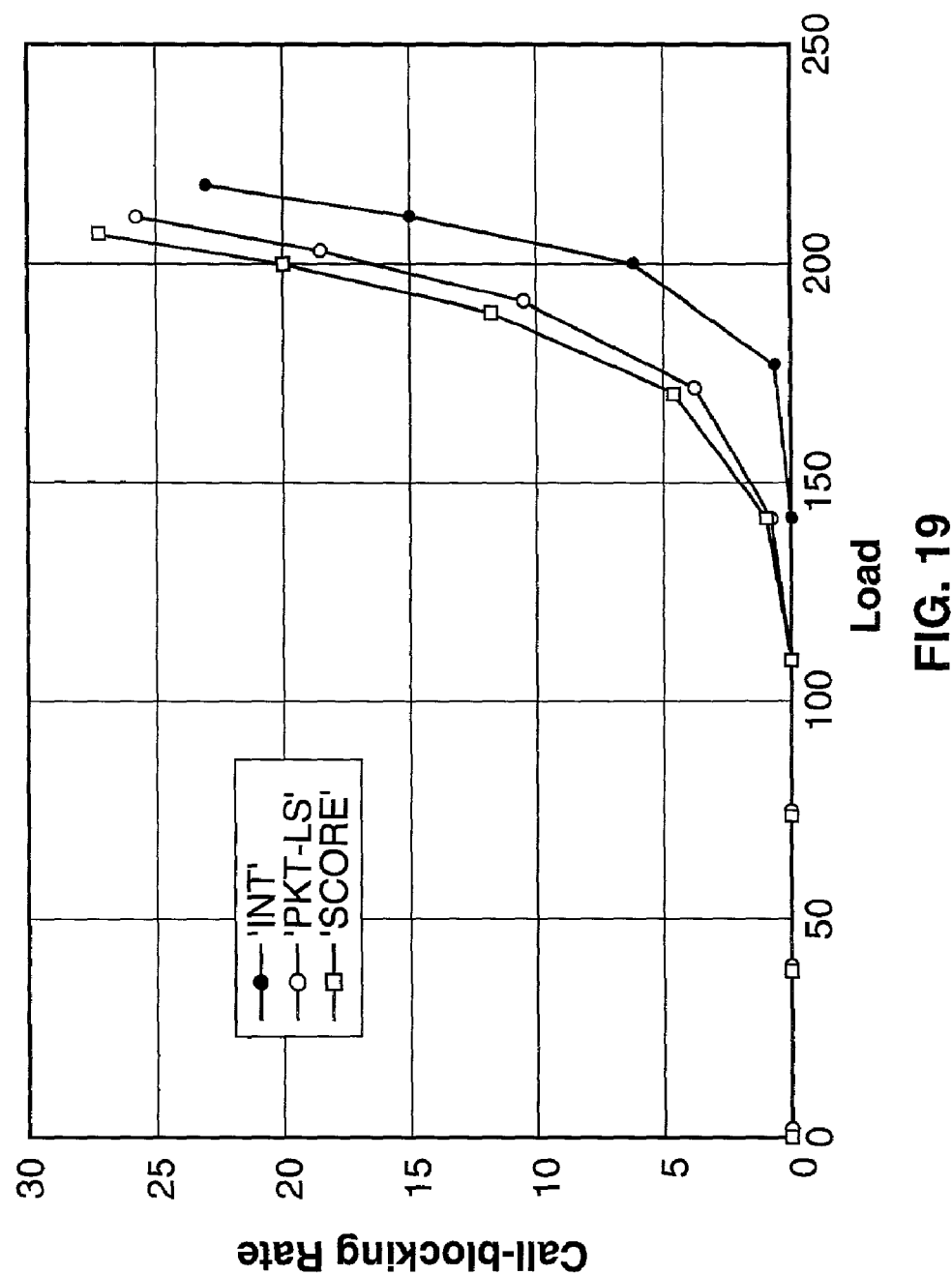
FIG. 19 is a graph comparing call-blocking rates under load according to an aspect of the present invention with that of SCORE and Intserv.
Figure 20:
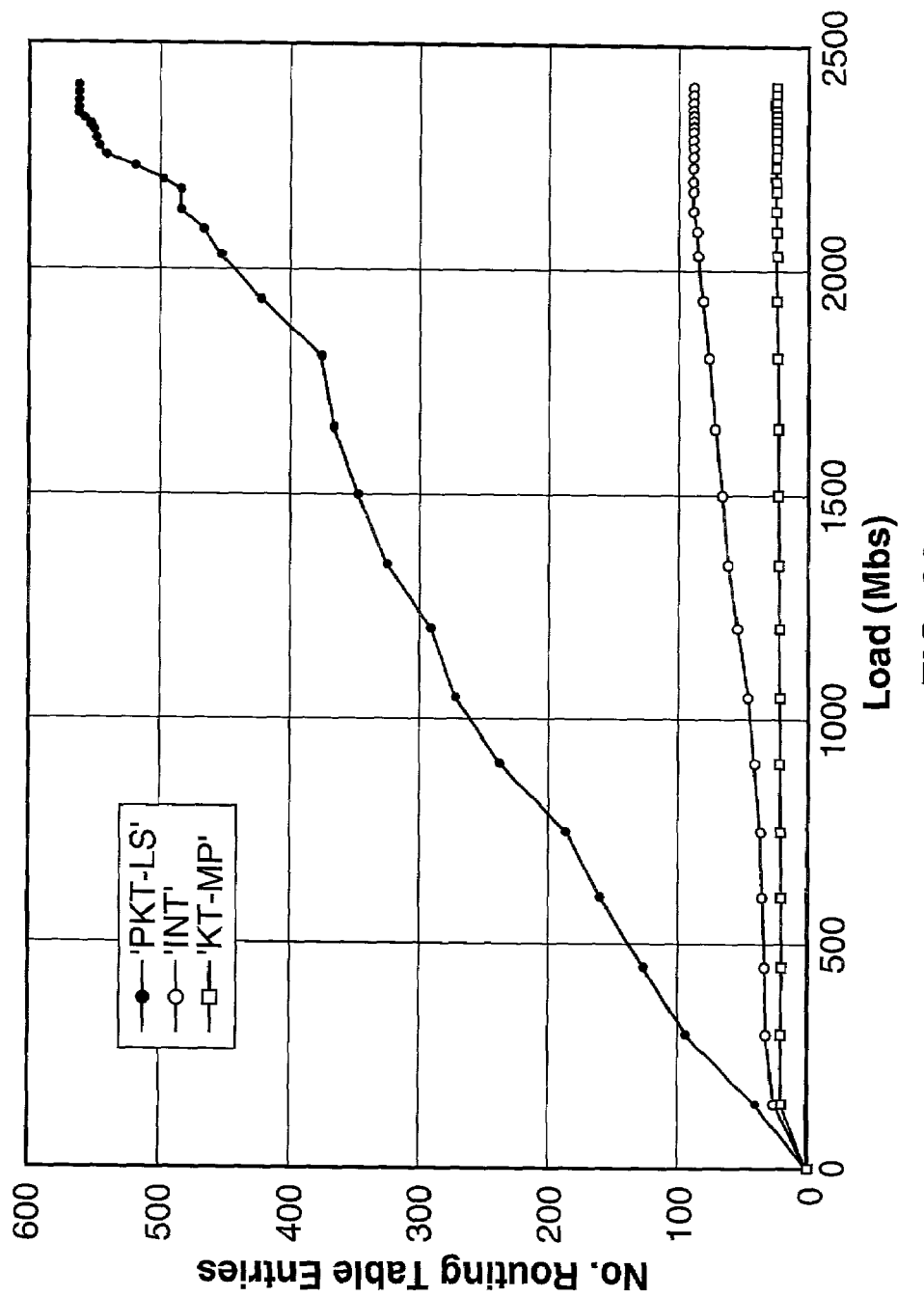
FIG. 20 is a graph of state size in response to load according to an aspect of the present invention, showing the greater stability of label state size in relation to per-flow routing states.

FIG. 19 illustrates call-blocking rates, and it may be observed that PKT-LS and BDT-DF perform better than SCORE. BDT-DF performs better than PKT-LS because there are only Q queues in BDTDF and so at most Q times the threshold bandwidth can be lost. Whereas the lost bandwidth in PKTLS can be up to QN times the threshold. The worst case behavior of PKT-LS and BDT-DF will be rarely seen because the path-selection algorithm try to optimize and setup flows mostly along the shortest-path and hence a link may not carry flows of all destinations.

In SCORE, there is strong coupling between flow behavior and reservation estimation algorithm. The estimation algorithm depends on the sending of "dummy packets" by the source when an individual flow rate drops below a predetermined point. Such unused bandwidth of real-time flows is best utilized for best-effort traffic. Because there are always inaccuracies in any characterization of a real-time flow, it is even more imperative that the best-effort traffic utilize as much of that unused bandwidth. In GSAI, the flow behaviors and reservation maintenance mechanisms are decoupled and hence GSAI architectures need no such dummy packets.

4.3. State Size

The state size in PKT-SP, PKT-MP and BDT-MP architectures is static and can be determined a priori from the network parameters. This is far more tractable and accessible to network engineering than state size that is a function of the dynamic nature of user flows. However, the state size in PKT-LS, BDT-DF and BDT-LS that use label-switching is not static, but depends on the arrival pattern of the flow requests. The following experiments were performed in which random flow requests are generated and signaled as in the previous section. The maximum size of the state in the routers is measured and plotted, as FIG. 20 indicates, wherein the label state size is significantly small compared to per-flow state and also levels off very quickly. It is generally a few times the size of state in the static architectures, and can be easily bounded, unlike the per-flow routing state.

4.4. Overhead of Refresh Mechanisms

A qualitative comparison is made of the refresh message overhead. However, before proceeding to compare refresh message overhead, a few observations on SCORE's use of IP header fields for encoding DPS state is in order. In SCORE, each packet carries information, such as Dynamic Packet State—DPS, consisting of the flow's reservation rate and other packet scheduling information. This extra information in each packet is an overhead that consumes bandwidth. To eliminate this overhead, a conventional technique has been suggested which encodes the DPS in the IP packet itself. Some of the DPS variables are stored in the 13-bit long ip-offset under the assumption that the field is rarely used. The assumption was justified based on the observation that in current internet traces only 0.22% of the packets are actually used the field. The IP packets that use this field are forwarded as best-effort traffic, which implies the delay guarantees do not hold for 0.22% of the packets. Despite the claim that ip-offset field is rarely used, current usage of the field does not indicate its future use, and it cannot be ruled out that this field will not be used extensively in future.

To avoid using separate MPLS labels for route pinning, SCORE uses a route pinning technique that uses only the addresses of the routers. It should be appreciated that the technique may fail to generate correct tables for some routes. Therefore, to provide correct implementation of SCORE, the DPS variables and the MPLS labels for route pinning must be encoded in separate fields. In contrast, PKT-SP, PKT-MP and BDT-MP requires no separate fields except for the class field for which the TOS field is used.

In view of the reasons stated above, the assumption that SCORE encodes DPS variables in fields outside the IP header is carried forward. The overhead of using DPS should then be considered, by way of example, a link of B Mbs capacity is considered. Assume SCORE uses packets of size at most X bytes and each packet carries a DPS state of 2 bytes. When the link bandwidth is fully allocated, the total bandwidth consumed by the DPS variables is $2 \times B|X$ Mbs. The overhead is determined by the packet size, wherein the smaller the packets greater the overhead. This provides a disincentive for the use of small packets. In addition, as link capacities increase from megabytes to gigabytes to terabytes, more and more bandwidth is consumed by the DPS.

To estimate the refresh message overhead in GSAI architectures, consider a network of N routers. Let the refresh message be of size X which is sent every $T_R$ seconds. The bandwidth on the link consumed by the refresh messages is then at most $N \times X|T_R$. This is a conservative bound because the refresh message needs to be sent for only those destination for which the link carries traffic. This overhead does not increase as link bandwidth increases, and only increases as number of destinations for which the link carries traffic increases. It should also be noted that label-switching refresh message overhead is given by $V \times X|T_R$, where V is the number of labels associated with the links.

Processing cost: In SCORE, extra instructions are required to process each packet to estimate the reservation, which increases as the link capacity increases. Also, for a given traffic rate, as packet sizes vary the processing requirements also vary. This is because of the strong coupling between the estimation algorithm and the end-user driven data traffic. In GSAI, processing related to reservation maintenance is decoupled from forwarding data traffic, and since the number of refresh messages on a link are bounded, so are the CPU cycles required to process them.

Accordingly, it will be seen that this invention provides a family of architectures (GSAI) that address some of the drawbacks of the Intserv architecture. The architectures use highly aggregated state in the routers, and yet provide the deterministic delay and bandwidth guarantees assured under the Intserv model. The aggregated state approach represents the middle ground between the stateful Intserv and the stateless SCORE architectures. All the GSAI architectures eliminate the need for per-flow state maintenance in the routers and are far more scalable than the Intserv model. Qualitative and quantitative comparisons are made between GSAI framework and the other two architectures.

The GSAI architectures are divided into two subfamilies. One family uses aggregate classes defined using the notion of burst-drain-time. The class definition is powerful and enables aggregation of a large number of flows into a small fixed number of queues and performs class-based scheduling. In the class-less family when introduced the device called shaper-battery which merges and shapes flows to L-burst flows. Within each subfamily, the use of destination-oriented routing and label-switching with flow aggregation where demonstrated. It is shown that GSAI provides a significant improvement over the use of Intserv.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Reference Table of Architectural Features

| | Class Type | Scheduling | Routing | Delay Field | Label Field |
|---|---|---|---|---|---|
| PKT-SP | PKT | Per-dest-class | single path | No | No |
| PKT-MP | PKT | Per-dest-class | multipaths | No | No |
| PKT-LS | PKT | Per-label-class | labeled-paths | No | Yes |
| BDT-DF | BDT | Per-class | labeled-paths | Yes | Yes |

TABLE 1-continued

Reference Table of Architectural Features

| | Class Type | Scheduling | Routing | Delay Field | Label Field |
|---|---|---|---|---|---|
| BDT-LS | BDT | Per-label-class | labeled-paths | No | Yes |
| BDT-MP | BDT | Per-dest-class | multipaths | No | No |

What is claimed is:

1. A method for maintaining the reservation state in a network router, comprising maintaining a bounded aggregate per-destination reservation state instead of a per-flow reservation state, wherein the source of a flow sends a refresh message to said router; and wherein all refresh messages of a particular destination are aggregated at said router, and wherein a refresh message specifies a destination and bandwidth for that destination.

2. A method as recited in claim 1:
wherein said router maintains rates of incoming and outgoing traffic; and
wherein said router does not maintain information on rates of flow.

3. A method as recited in claim 1, further comprising maintaining a set of token-buckets arranged in the form of a tree for aggregating network flows into classes.

4. A method as recited in claim 1, further comprising aggregating network flows utilizing burst-drain-time or burst-ratio.

5. A method as recited in claim 1, further comprising merging a set of data flows into a smaller set of aggregated flows.

6. A method as recited in claim 5, where in said data flows are merged based on class or destination.

7. A method as recited in claim 1, wherein said router maintain state only for aggregated flows and processes only aggregated flows.

8. A method as recited in claim 7, further comprising:
providing guarantees to aggregated flows; and
providing guarantees to individual flows within the aggregated flows.

9. A method as recited in claim 1, further comprising using diffusing computations to maintain consistency of the reservation.

10. A method as recited in claim 1, wherein said aggregate state has a size and associated refresh mechanism.

11. A method as recited in claim 10, wherein aggregate state size and refresh mechanism complexity are a function of a network parameter rather than a function of the number of end-user flows.

12. A method as recited in claim 11, wherein said network parameter comprises class.

13. A method as recited in claim 11, wherein said network parameter comprises destination.

14. A method as recited in claim 1, wherein said step of maintaining aggregate per-destination reservation state instead of a per-flow reservation state comprises storing and refreshing resource reservations on a per-destination basis rather than on a per-flow basis.

15. A method as recited in claim 1, further comprising utilizing per-destination refresh messages instead of per-flow refresh messages.

16. A method as recited in claim 15, wherein a refresh message specifies a destination and bandwidth for that destination.

17. A method as recited in claim 16, wherein when a flow terminates, the source stops sending refresh messages and bandwidth reserved for the flow is released.

18. A method as recited in claim 1, wherein when a flow terminates, the source stops sending refresh messages and bandwidth reserved for the flow is released.

19. A method for maintaining the reservation state in a network router, comprising storing and refreshing resource reservations on a per-destination basis, rather than on a per-flow basis, wherein the source of a flow sends a refresh message to said router; and wherein all refresh messages of a particular destination are aggregated at said router; and wherein a refresh message specifies a destination and bandwidth for that destination.

20. A method as recited in claim 19:
wherein said router maintains rates of incoming and outgoing traffic; and
wherein said router does not maintain information on rates of flow.

21. A method as recited in claim 19, further comprising maintaining a set of token-buckets arranged in the form of a tree for aggregating network flows into classes.

22. A method as recited in claim 19, further comprising aggregating network flows utilizing burst-drain-time or burst-ratio.

23. A method as recited in claim 19, further comprising merging a set of data flows into a smaller set of aggregated flows.

24. A method as recited in claim 23, wherein said data flows are merged based on class or destination.

25. A method as recited in claim 19, wherein said router maintain state only for aggregated flows and processes only aggregated flows.

26. A method as recited in claim 25, further comprising:
providing guarantees to aggregated flows; and
providing guarantees to individual flows within the aggregated flows.

27. A method as recited in claim 19, further comprising using diffusing computations to maintain consistency of the reservation.

28. A method as recited in claim 19, wherein said aggregate state has a size and associated refresh mechanism.

29. A method as recited in claim 28, wherein aggregate state size and refresh mechanism complexity are a function of a network parameter rather than a function of the number of end-user flows.

30. A method as recited in claim 29, wherein said network parameter comprises class.

31. A method as recited in claim 29, wherein said network parameter comprises destination.

32. A method as recited in claim 19, further comprising utilizing per-destination refresh messages instead of per-flow refresh messages.

33. A method as recited in claim 32, wherein a refresh message specifies a destination and bandwidth for that destination.

34. A method as recited in claim 33, wherein when a flow terminates, the source stops sending refresh messages and bandwidth reserved for the flow is released.

35. A method as recited in claim 19, wherein when a flow terminates, the source stops sending refresh messages and bandwidth reserved for the flow is released.

36. A method for maintaining the reservation state in a network router, comprising:
  merging a set of data flows into a smaller set of aggregated flows; and
  storing and refreshing resource reservations on a per-destination basis, rather than on a per-flow basis;
  wherein said router maintains rates of incoming and outgoing traffic; and
  wherein said router does not maintain information on rates of flow, wherein the source of a flow sends a refresh message to said router; and wherein all refresh messages of a particular destination are aggregated at said router, and wherein a refresh message specifies a destination and bandwidth for that destination.

37. A method as recited in claim 36, further comprising maintaining a set of token-buckets arranged in the form of a tree for aggregating network flows into classes.

38. A method as recited in claim 40, further comprising aggregating network flows utilizing burst-drain-time or burst-ratio.

39. A method as recited in claim 36, wherein said data flows are merged based on class or destination.

40. A method as recited in claim 36, wherein said router maintains state only for aggregated flows and processes only aggregated flows.

41. A method as recited in claim 40, further comprising:
  providing guarantees to aggregated flows; and
  providing guarantees to individual flows within the aggregated flows.

42. A method as recited in claim 36, further comprising using diffusing computations to maintain consistency of the reservation.

43. A method as recited in claim 36, wherein said aggregate state has a size and associated refresh mechanism.

44. A method as recited in claim 43, wherein aggregate state size and refresh mechanism complexity are a function of a network parameter rather than a function of the number of end-user flows.

45. A method as recited in claim 44, wherein said network parameter comprises class.

46. A method as recited in claim 44, wherein said network parameter comprises destination.

47. A method as recited in claim 36, further comprising utilizing per-destination refresh messages instead of per-flow refresh messages.

48. A method as recited in claim 47, wherein a refresh message specifies a destination and bandwidth for that destination.

49. A method as recited in claim 48, wherein when a flow terminates, the source stops sending refresh messages and bandwidth reserved for the flow is released.

50. A method as recited in claim 36, wherein when a flow terminates, the source stops sending refresh messages and bandwidth reserved for the flow is released.

* * * * *